United States Patent [19]

Fukushima et al.

[11] Patent Number: 5,130,830
[45] Date of Patent: Jul. 14, 1992

[54] SPATIAL LIGHT MODULATOR AND SPATIAL LIGHT MODULATING APPARATUS WITH ALIGNMENT FILM HAVING PARTICULAR CONDUCTANCE

[75] Inventors: Seiji Fukushima, Zama; Takashi Kurokawa, Urawa; Takashi Kozawaguchi, Tokyo; Shinji Matsuo, Zama, all of Japan

[73] Assignee: Nippon Telegraph and Telephone Corporation, Tokyo, Japan

[21] Appl. No.: 485,226

[22] Filed: Feb. 26, 1990

[30] Foreign Application Priority Data

Feb. 27, 1989 [JP] Japan .................... 1-45716
Jun. 16, 1989 [JP] Japan .................... 1-154127

[51] Int. Cl.⁵ .................... G02F 1/1335; G02F 1/135; G02F 1/1337; G02F 1/1343
[52] U.S. Cl. .................... 359/72; 359/71; 359/75; 359/56; 359/100
[58] Field of Search .................... 350/342, 338, 350 S, 350/340; 357/16, 17; 359/72, 71, 100, 84, 75, 56

[56] References Cited

U.S. PATENT DOCUMENTS

| 4,191,454 | 3/1980 | Braatz et al. | 350/342 |
|---|---|---|---|
| 4,824,218 | 4/1989 | Kuno et al. | 350/350 S |
| 4,826,300 | 5/1989 | Efron et al. | 359/72 |
| 4,914,224 | 4/1990 | Shoji et al. | 350/350 S |
| 4,941,735 | 7/1990 | Moddel et al. | 350/342 |
| 4,999,696 | 3/1991 | Gertner et al. | 357/16 |

FOREIGN PATENT DOCUMENTS

| 0334340 | 9/1989 | European Pat. Off. |  |
| 59-216126 | 12/1984 | Japan . |  |
| 0056419 | 3/1989 | Japan | 350/342 |
| 2181263 | 4/1987 | United Kingdom . |  |
| WO89/01174 | 2/1989 | World Int. Prop. O. |  |

OTHER PUBLICATIONS

"High speed light valve using an amorphous silicon photosensor and ferroelectric liquid crystals," by N. Takahashi et al, Applied Physics Letters, vol. 51, No. 16, 19 Oct. 1987.
Proceedings of the SID, vol. 29, No. 4, 1988, pp. 255–258, S. Matsumoto, et al, Large-Area Video-Rate Multicolor Ferroelectric LCD.
Molecular Crystals & Liquid Crystals, vol. 144, Mar. 1987, pp. 309–316, D. Armitage et al, Ferroelectric Liquid Crystals Spatial Light Modulator.
Japanese Journal of Applied Physics, vol. 28, No. 1, Jan. 1989, pp. L116–L118, K. Nakaya et al, Electrooptic Bistability of a Ferroelectric Liquid Crystal Device Prepared Using Charge-Transfer Complex-Doped Polyimide-Orientation Films.
W. P. Bleha et al, Application of the Liquid Crystal Light Valve to Real-Time Optical Data Processing, vol. 17, pp. 371–384, Optical Engineering, 1978.
D. Armitage et al, Ferroelectric liquid-crystal and fast nematic spatial light modulators, SPIE, vol. 684, pp. 60–68 Liquid Crystals and Spatial Light Modulator Materials (1986).
G. Moddel et al, Optical Addressing of High-Speed Spartial Light Modulators with Hydrogenated Amorphous Silicon, vol. 118, pp. 405–410, Materials Research Society, 1988.

Primary Examiner—Stanley D. Miller
Assistant Examiner—Anita Pellman Gross
Attorney, Agent, or Firm—Frishauf, Holtz, Goodman & Woodward

[57] ABSTRACT

A spatial light modulator has a photoconductive layer deposited on one glass substrate having a transparent electrode. A first liquid crystal alignment film is formed on the photoconductive layer. A second liquid crystal alignment film is formed on another glass substrate having another transparent electrode. A ferroelectric liquid crystal is filled between the first and second liquid crystal alignment films.

14 Claims, 20 Drawing Sheets

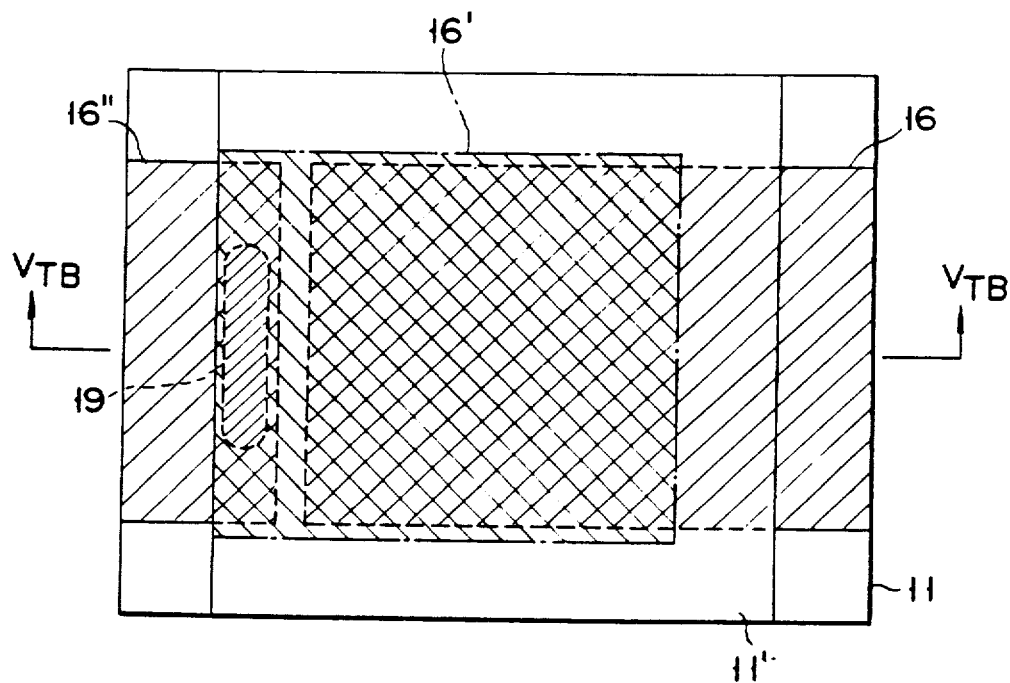
F I G. 6A
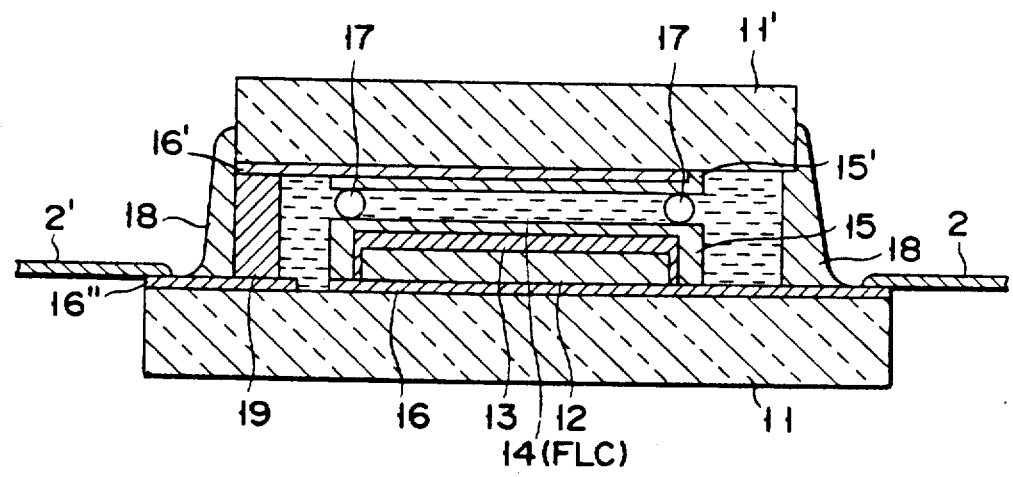
F I G. 6B

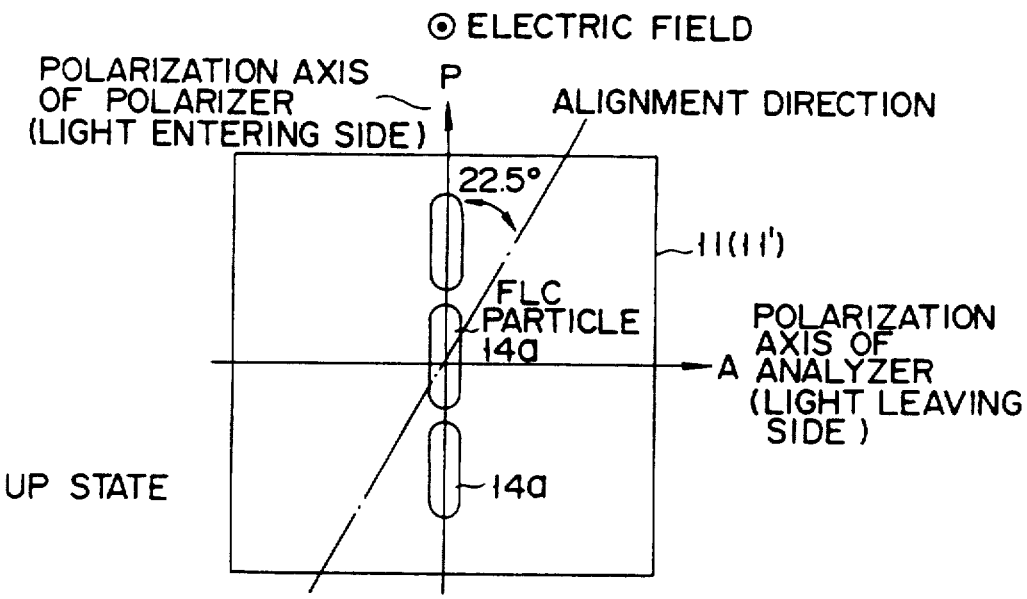
F I G. 7A
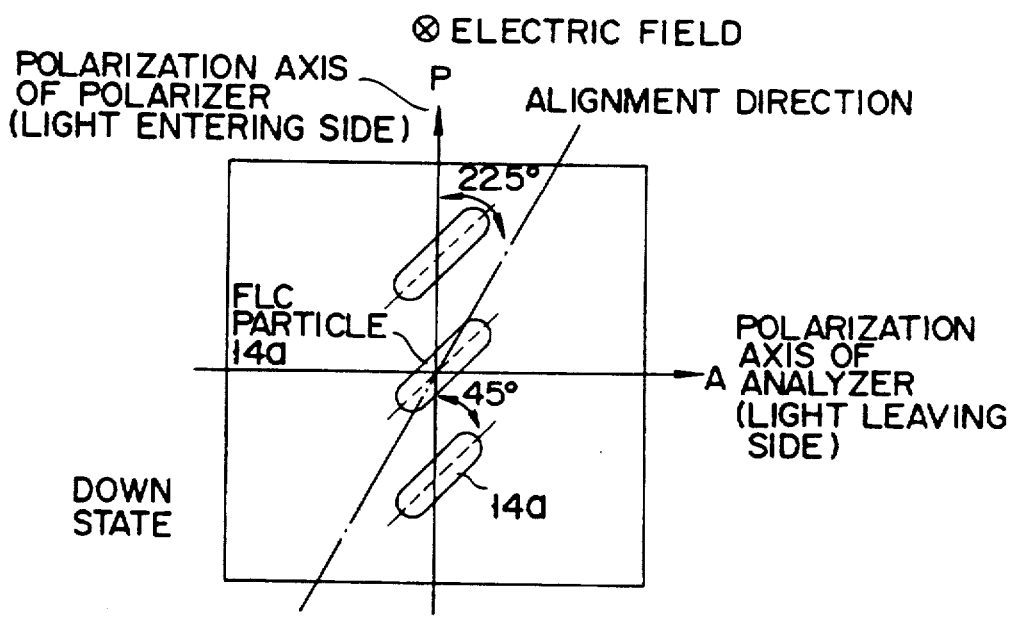
F I G. 7B

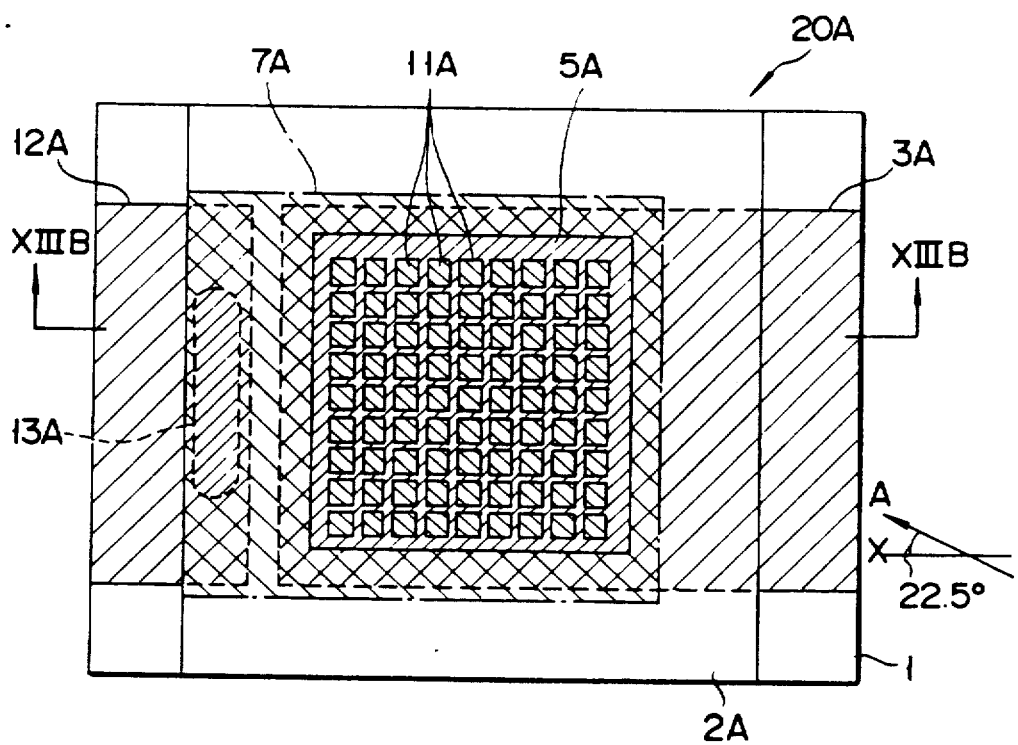
F I G. 13A
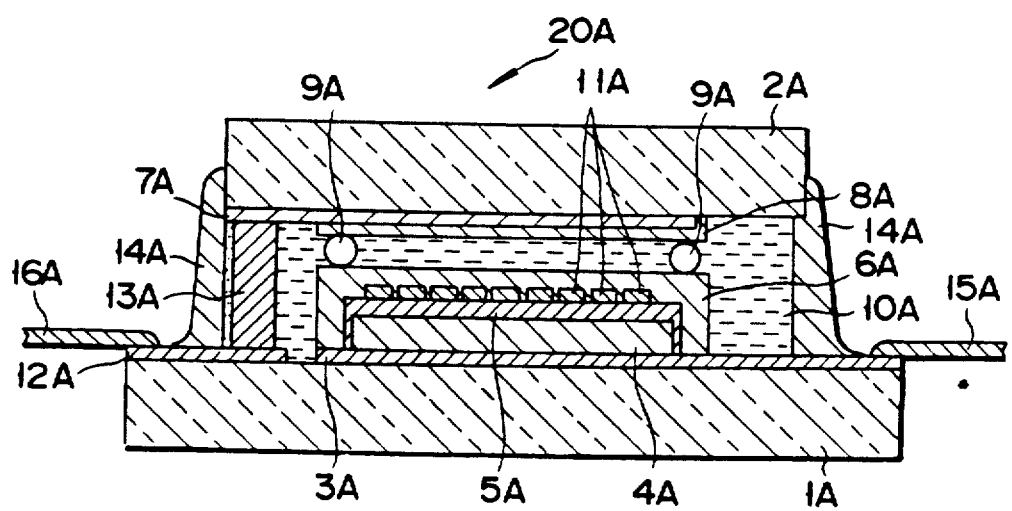
F I G. 13B

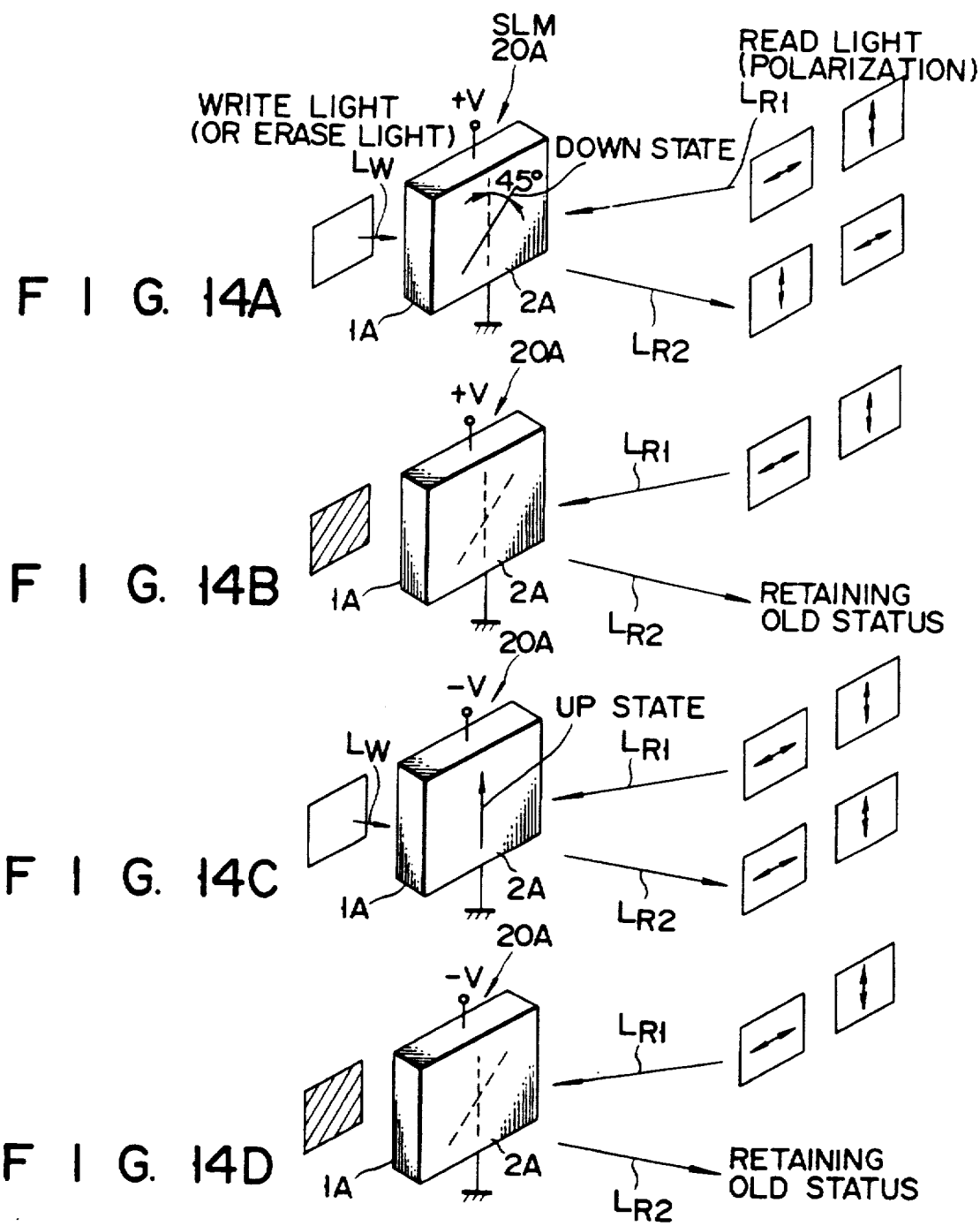

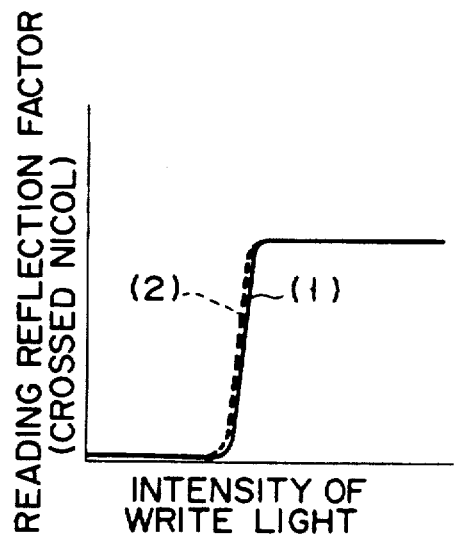
F I G. 15A
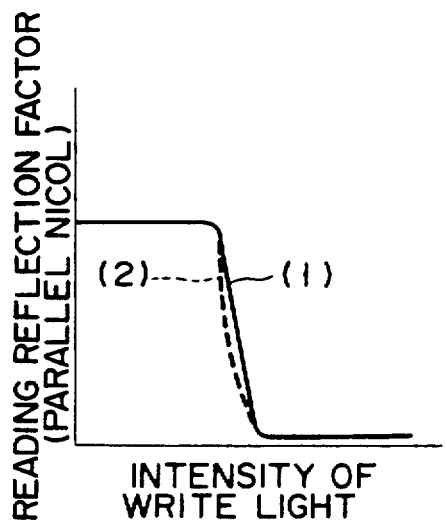
F I G. 15B
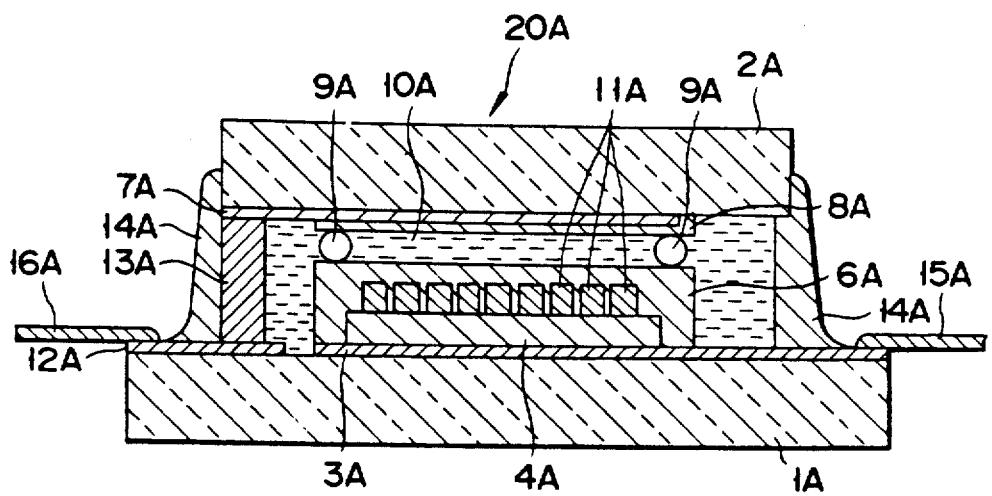
F I G. 16

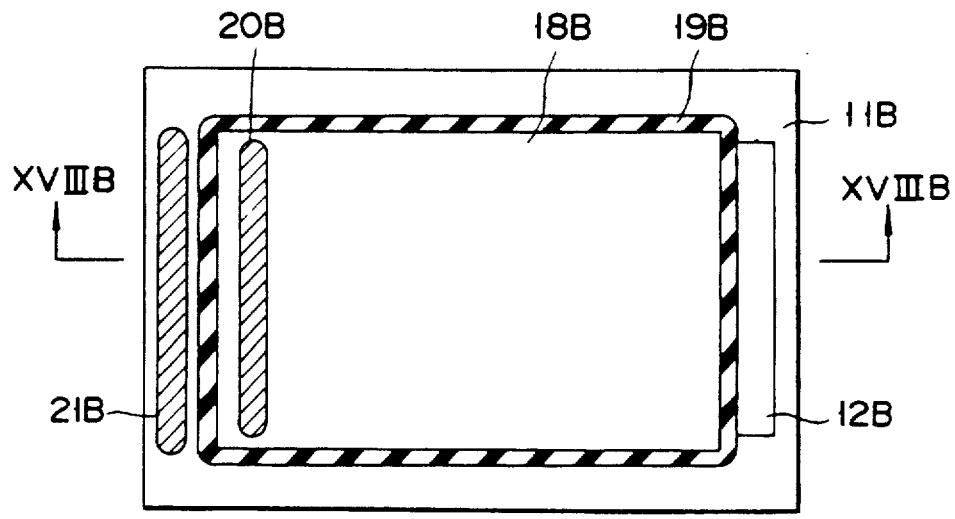
F I G. 18A
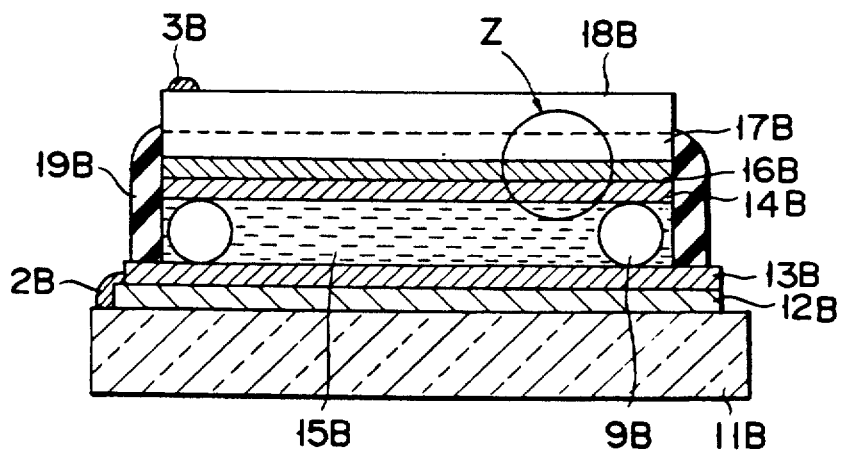
F I G. 18B

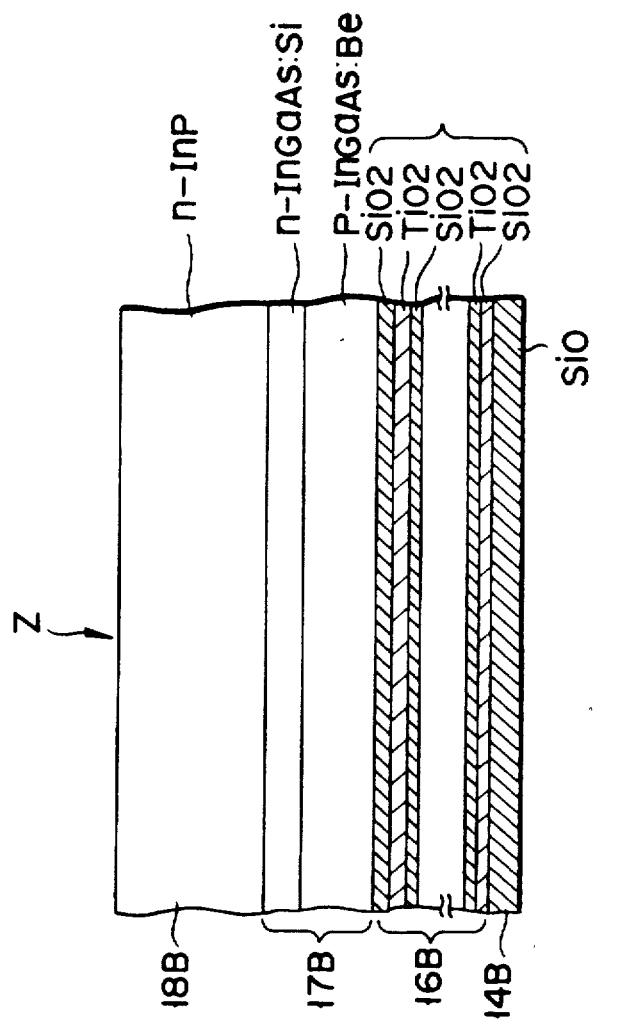
F I G. 18C

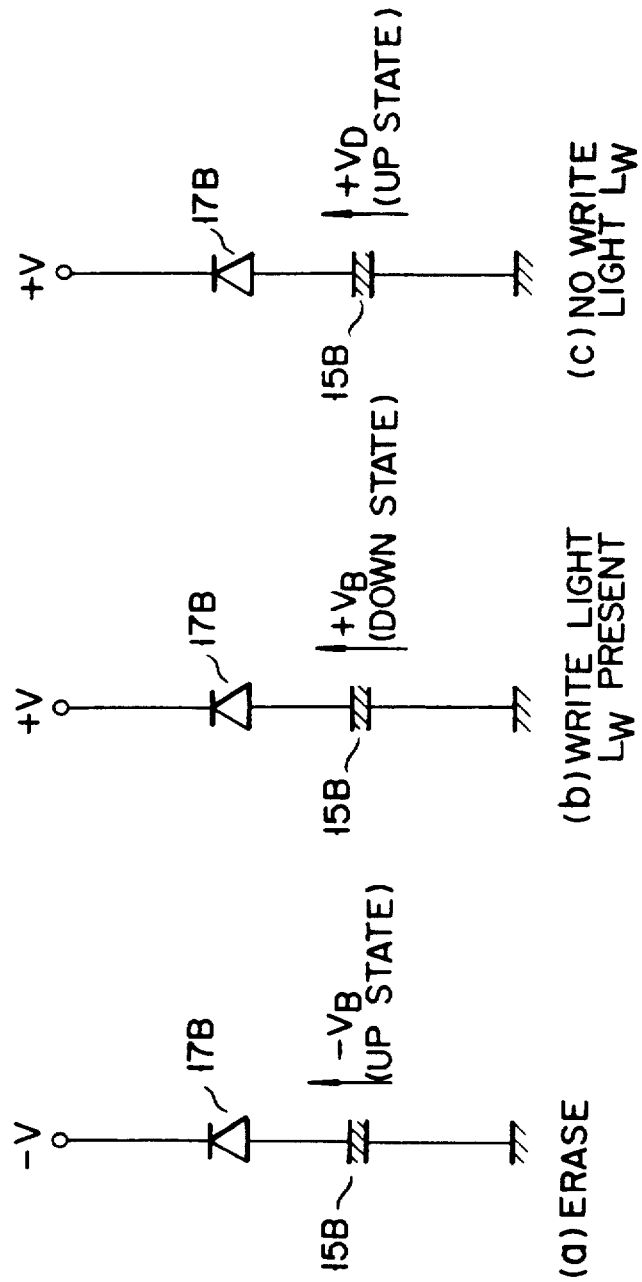

PULSE APPLIED TO SLM (ERASE PULSE) (WRITE PULSE)

WRITE LIGHT Lw

VOLTAGE TO BE APPLIED TO FLC

INTENSITY OF READ LIGHT Lr

SPATIAL LIGHT MODULATOR AND SPATIAL LIGHT MODULATING APPARATUS WITH ALIGNMENT FILM HAVING PARTICULAR CONDUCTANCE

BACKGROUND OF THE INVENTION

1. Field of the Invention

The present invention relates to a spatial light modulator and a spatial light modulating apparatus which can execute real time light modulation and real time image storage.

2. Description of the Related Art

A spatial light modulator (hereinafter referred to as SLM) functions to write a two dimensional pattern (e.g., an image) therein with write light and read the pattern with another light (read light). This can ensure processes such as amplification of image light, a process involving a threshold value, inversion, incoherent-coherent conversion between read light and write light and wavelength conversion.

A conventional SLM is constituted using a nematic liquid crystal 101 (see Optical Engineering, Vol. 17, p. 371, 1978). The SLM 100 employs a photodiode structure of CdS/CdTe as a photosensitive layer 102, and the nematic liquid crystal 101 is filled neighboring on a dielectric mirror 103. For that portion irradiated with write light 104, due to its diode characteristic, a voltage applied to the liquid crystal 101 increases over a threshold value of a liquid crystal. As a result, the liquid crystal axis having been aligned along the face of glass substrate 105 is aligned in the voltage-applied direction. Accordingly, the plane of polarization does not rotate by linearly polarized read light 106. For that part not irradiated with the write light 104, as the liquid crystal axis remains aligned along the face of the glass substrate 105, the plane of polarization of the read light 106 rotates. It is therefore possible to read out a pattern corresponding to a written pattern through an analyzer (not shown).

Another conventional SLM is known which uses a ferroelectric liquid crystal (hereinafter referred to as FLC) having a higher response speed, as shown in FIGS. 2 and 3 (refer to SPIE, Vol. 684, p. 60, 1986 and Mat. Res. Soc. Symp. Proc., Vol. 118, p. 405, 1988). According to a conventional SLM 110 shown in FIG. 2, a BSO (bismuth silicon oxide) is used for a photosensitive layer 111, and the thin film is adhered on one glass substrate 112, with a FLC 113 being filled between two glass substrates. According to a SLM 120 shown in FIG. 3, an a-Si (amorphous silicon) film having a p-i-n diode structure is used as a photosensitive layer 121, and a FLC 123 is filled between glass substrates 124 neighboring on a reflector 122.

The above-described conventional SLMs have the following problems.

(1) According to the structure of the SLM 100 shown in FIG. 1, the response speed of the nematic liquid crystal 101 is slow, so that the SLM 100 operates at a speed of as high as several tens of milliseconds. Further, without a memory capability, the SLM 100 should execute pattern writing and reading simultaneously.

(2) According to the structure of the SLM 110 shown in FIG. 2, the response speed of the BSO of the photosensitive layer 111 is slow, so that the SLM 110 likewise operates at a speed of as high as several tens of milliseconds. As the BSO is insensitive to red light, it is necessary to use a specific type of light, e.g., argon laser light, as write light. Further, since a thin film of BSO should be adhered on the top of the glass substrate 112 to provide a SLM, the fabrication of the SLM is not easy and it is difficult to control the uniform thickness of the SLM. Because of no memory capability, the SLM 110 should always be applied with a pulse voltage, does not operate on a single non-repetitive pulse, and provides a low contrast due to attenuation.

(3) According to the structure of the SLM 120 shown in FIG. 3 in which an a-Si film having a p-i-n diode structure is used as the photosensitive layer 121, because of the diode characteristic, a pattern can be written only when a negative voltage is applied and write light 125 needs a high intensity of 50 mW/cm$^2$, thus impairing the sensitivity. Likewise, due to no memory capability, the SLM 120 should always be applied with a pulse voltage, does not operate on a single non-repetitive pulse, and provides a low contrast due to attenuation.

Another prior art is known which is an optical recording device having a combination of a photo-conductive layer and a BLC and a recording method utilizing the same as disclosed in Published Unexamined Japanese Patent Application No. 59-216126. FIG. 4 illustrates the structure of the prior art; referring to this diagram, 401 and 401' are transparent substrates, 402 and 402' are transparent conductive layers, 403 is a photoconductive layer, 404 is a light shielding layer, 405 is a dielectric mirror, 406 and 406' are thin insulating layers, 407 is a FLC layer, 408 and 409 are DC voltage sources, 410 is a switch, 411 is write light, 412 is a polarization plate, and 413 is read light. The DC voltage sources 408 and 409 are selectively used by the switch 410 so that a bi-stable switching is effected by application of a positive voltage or a negative voltage. With this structure, since no alignment film exists in the device, the initial aligning direction cannot be stably defined for a long period of time, the contrast will be deteriorated. According to the recording method that keeps applying a DC voltage at the time of image erasing and writing the life of the liquid crystal is shortened because of different voltages applied to the FLC and different time intervals of voltage application at the time of erasing and writing.

SUMMARY OF THE INVENTION

Accordingly, it is an object of this invention to provide a spatial light modulator and a spatial light modulating apparatus, which has an improved operation speed and a sufficient memory capability, can perform a writing operation in both cases where a positive pulse and a negative pulse are applied, and can write an inverted pattern such as a positive image and a negative image in either case.

To achieve this object, there is provided a spatial light modulator comprising: a photoconductive film deposited on one glass substrate having a transparent electrode; a first liquid crystal alignment film deposited on the photoconductive film; a second liquid crystal alignment film deposited on another glass substrate having another transparent electrode; and a ferroelectric liquid crystal filled between the first and second liquid crystal alignment films.

There is also provided a spatial light modulating apparatus comprising: a spatial light modulator having a photoconductive film deposited on one glass substrate having a transparent electrode, a first liquid crystal alignment film deposited on the photoconductive film, a second liquid crystal alignment film deposited on another glass substrate having another transparent electrode, a ferroelectric liquid crystal filled between the first and second liquid crystal alignment films; and driving power source means for applying a control pulse to the transparent electrodes on the glass substrates such that a pulse width and a voltage of the applied control pulse are variable.

According to the present spatial light modulator and spatial light modulating apparatus with the above structures, using a nonplanar photoconductive layer, formed by a film deposition method, a photosensitive layer can increase the response speed of the layer and using a ferroelectric liquid crystal having a high response characteristic, the present spatial light modulator can increase the operation speed. Further, a sufficient memory capability can be provided by driving the spatial light modulator with such a control pulse that a pulse applied to the ferroelectric liquid crystal exceeds a threshold value representing a self-retaining property. In addition, the nonpolar photo-conductive layer ensures writing of a pattern in either case where a positive control pulse or a negative control pulse is applied, and ensures writing of an inverted pattern by properly altering the voltage applied modes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 6A is a plan view illustrating the structure of one embodiment of a SLM of the present invention;

FIG. 6B is a cross sectional view taken along the line VI—VI in FIG. 6A and viewed from the arrowhead direction;

FIGS. 7A and 7B are diagrams for explaining how the liquid crystal in the present SLM is aligned;

FIG. 13A is a plan view illustrating a pattern of electrodes and a metal film, which is another embodiment of a SLM of the present invention;

FIG. 13B is a cross sectional view taken along the line XIIB—XIIB in FIG. 13A and viewed from the arrowhead direction;

FIGS. 14A through 14D are diagrams for explaining the operation of the SLM shown in FIGS. 13A and 13B;

FIGS. 15A and 15B are input/output characteristic charts for the SLM shown in FIGS. 13A and 13B;

FIG. 16 is a cross sectional view illustrating a modification of the present SLM shown in FIG. 13B, in which only a metal light shielding film is provided as a reflection film;

FIG. 18A is a plan view illustrating the structure of another embodiment of the present SLM, in which a photodiode is deposited on a semiconductor substrate;

FIG. 18B is a cross sectional view taken along the line XVIIIB—XVIIIB in FIG. 18A and viewed from the arrowhead direction;

FIG. 18C is an enlarged cross section of a portion Z in FIG. 18B;

FIGS. 19A through 19C are diagrams for explaining the operation of an equivalent circuit of the SLM shown in FIGS. 18A to 18C and a voltage applied to a FLC;

DETAILED DESCRIPTION OF THE PREFERRED EMBODIMENTS

Preferred embodiments of a SLM and a spatial light modulating apparatus according to this invention will now be described referring to the accompanying drawings.

Figure 5:
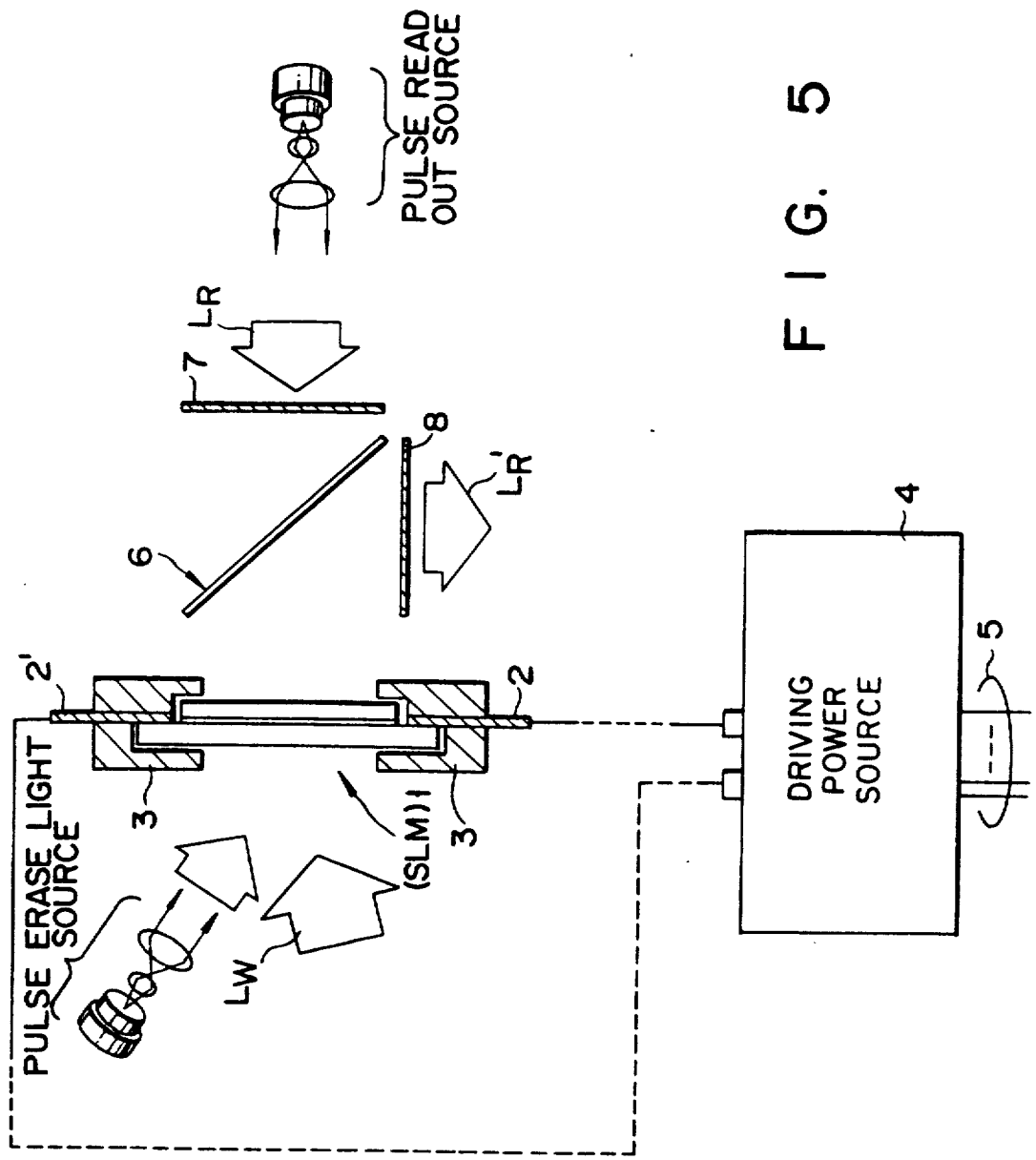
FIG. 5 is a structural diagram illustrating one embodiment of a spatial light modulating apparatus of the present invention.

FIG. 5 illustrates the structure of one embodiment of this invention. Referring to this diagram, 1 is a SLM, 2 and 2' are lead electrodes, 3 is a holder for holding the SLM 1, 4 is a driving power source for driving the SLM 1 with a control pulse, 5 is a control line for controlling the (SLM) 1 by a computer (not shown), and 6 is a half mirror. A two-dimensional pattern to be a modulation signal is irradiated as write light $L_W$ on the writing surface side of the SLM 1, and at the same time a control pulse is applied to the SLM 1 from the driving power source 4, thereby permitting the pattern to be written. The control pulse from the driving power source 4 has its pulse width, voltage, polarity and so forth manually set or controlled by a program by a command from a computer in order to provide a memory capability of the SLM 1. Read light $L_R$ passes a polarizer 7 and becomes a linearly polarized light beam which is spatially uniform. This beam enters the read surface side of the SLM 1 through the half mirror 6, and is modulated and reflected therefrom. The resulted light is then reflected by the half mirror 6 and passes an analyzer 8 to be read light $L_R'$. This light is then read out as an intensity pattern.

FIGS. 6A and 6B present detailed illustrations of the structure of the SLM according to the above embodiment, the former being a top view showing an electrode pattern and the latter being a cross sectional view taken along the line VI—VI in FIG. 6A. Reference numerals 11 and 11' are glass substrates, 12 is a photoconductive layer sensitive to write light, 13 is a dielectric mirror, 14 is a FLC, 15 and 15' are alignment films for aligning the FLC, 16, 16' and 16" are transparent electrodes, 17 is a spacer for keeping the thickness of the layer of the FLC 14 constant, 18 is an adhesive for sealing and securing the FLC 14, and 19 is a silver paste layer for electrically connecting the upper transparent electrode 16' the lower transparent electrode 16" to provide an electric connection with the lead electrode 2'. The transparent electrodes 16 and 16" are formed on the glass substrate 11 on the writing side. The nonpolar photoconductive layer 12 is formed on the transparent electrode 16 by a film deposition method. The dielectric mirror 13 and the alignment film 15 are formed in the named order on the photoconductive layer 12. The transparent electrode 16' is formed on the other glass substrate 11' on the reading side, and the alignment film 15' is formed on this electrode 16'. A gap is formed between the alignment films 15 and 15' by the spacer 17, and the FLC 14 is filled in the gap.

It should be noted that the FLC 14 in the above structure has a tilt angle of about 22.5 degrees and has a good self-retaining property. To improve the self-retaining property, the FLC 14 should have a small spontaneous polarization preferably of 20 nC/cm² or less. FIGS. 7A and 7B illustrate the aligning state of the FLC 14. The alignment films (e.g., polyimide or polyvinyl alcohol films having a thickness of about 5000 angstroms or below) on the glass substrates 11 and 11' are subjected to weak alignment in the direction of 22.5 degrees with respect to the polarization axis P of the polarizer on the light incident side. At this time, liquid crystal molecules 14a are aligned in the same direction as the polarizer's polarization axis P (up state) or in the direction at 45 degrees to the axis P (down state (FIG. 7A)) in accordance with the direction of an electric field of the control pulse In the up state, the light entering the FLC layer 14 through the polarizer 7 (FIG. 5) and reflected therefrom returns with the original polarization state maintained. In the down state, the plane of polarization of the returning light is rotated due to the refractive index anisotropy of the FLC 14. If the thickness d of the FLC layer 14 is set to be $$d = m \cdot \lambda / (4 \cdot \Delta n)$$

where $m = 1, 3, 5, \ldots$, $\lambda$ is the wavelength of read light and $\Delta n$ is the difference between parallel and perpendicular refractive indexes of the molecules of the FLC, the plane of polarization of the returning light is rotated 90 degrees. In order to improve the self-retaining property of the FLC as well as the response speed, it is desirable to form the FLC layer 14 as thin as possible. In this respect, it is desirable to set $m = 1$. Normally, d is about 2 μm, and to control the FLC layer to uniformly have this thickness, spherical insulation particles of an equal size are dispersed as the spacer 17 in the FLC layer 14.

Figure 1:
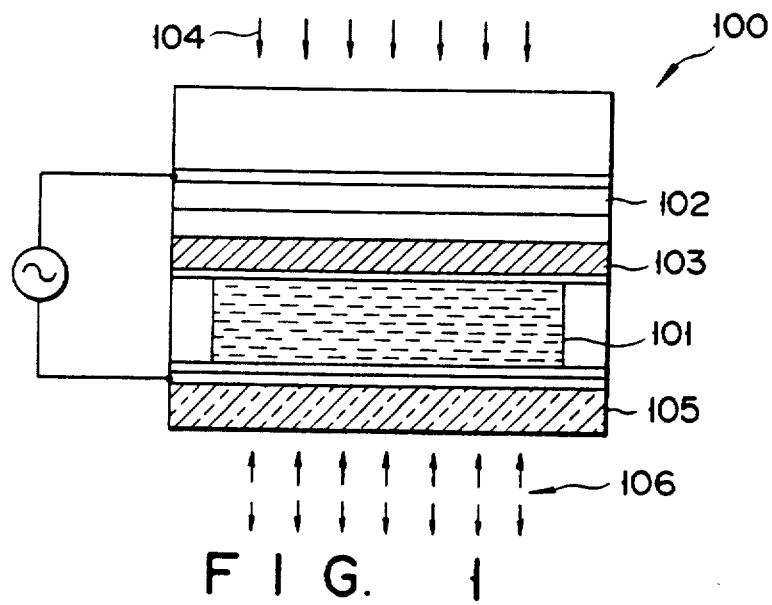
FIGS. 1 through 4 are cross sectional views of the structures of conventional SLMs.
Figure 2:
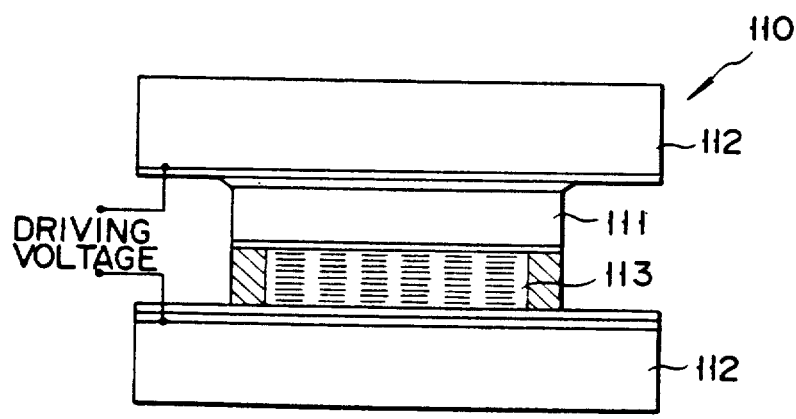
Figure 3:
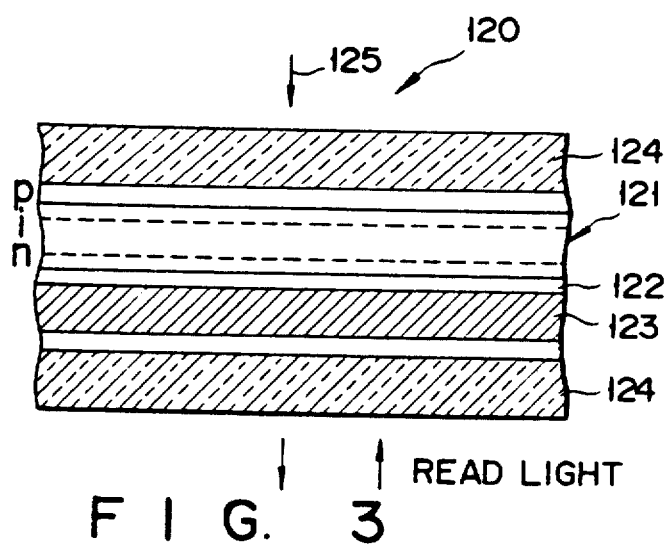
Figure 4:
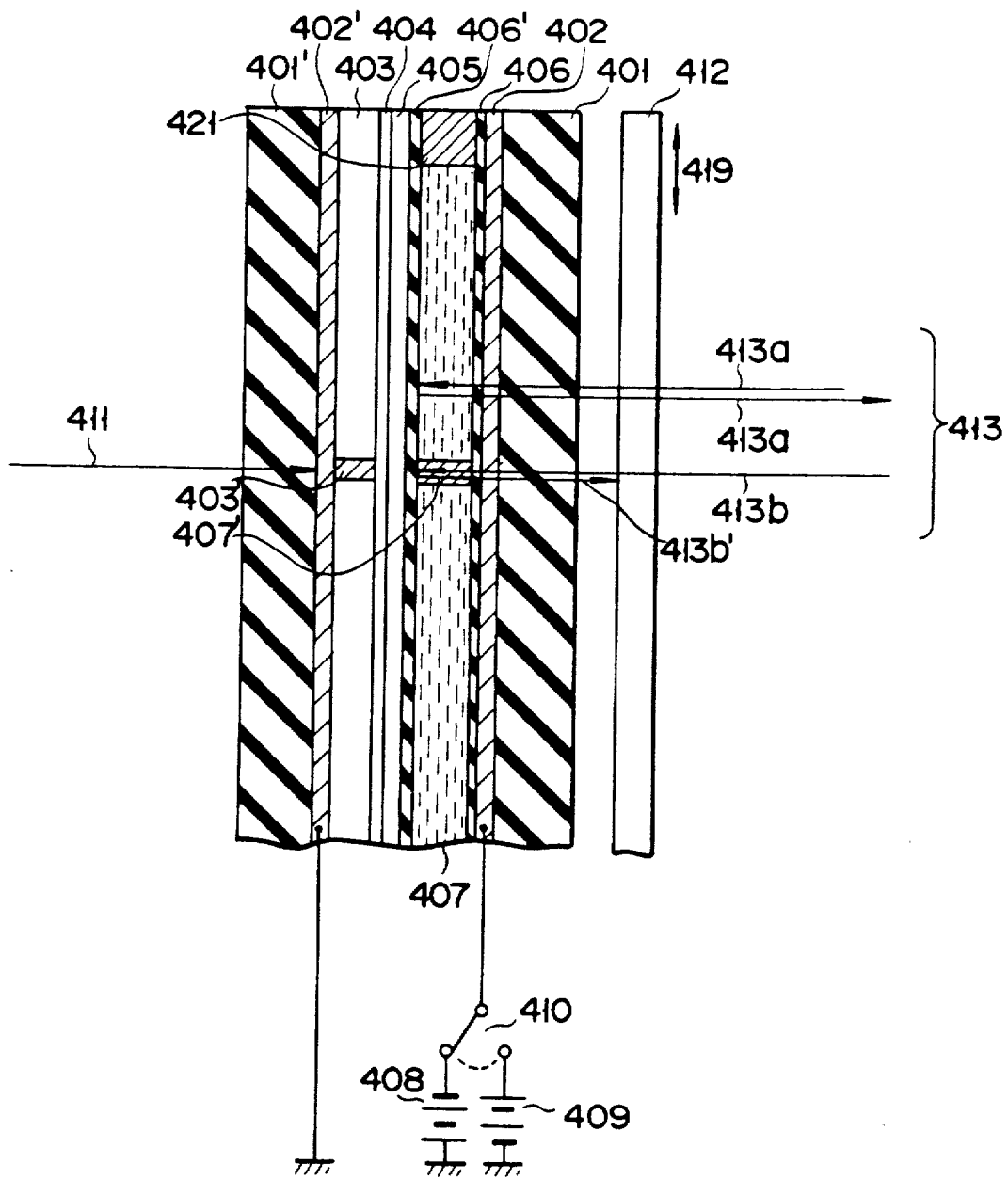

As a photosensitive layer in the embodiment, the photoconductive layer 12 made of an amorphous silicon (a-Si) is used. In general, this layer 12 is formed as a hydrogen-doped film with a high sensitivity on the glass substrate by a plasma CVD method, for example. Although there is known a p-i-n diode structure provided by doping of an element of the III-V group as already described with reference to the prior art as shown in FIG. 3, this structure is not preferable because the operation involves the polarity. This embodiment employs a photoconductive layer with a uniform thickness, not the p-i-n structure, thereby ensuring an operation with respect to both of a control pulse having the positive polarity and the one with the negative polarity. The thickness of the a-Si film 12 is determined by the balance between the electric capacitance and resistance component; it is desired to be about 2 to 7 μm.

The dielectric mirror 13 has two types of dielectric films alternately laminated one on another. The material for the dielectric films should have a large dielectric constant; in the experiment, 17 layers of $TiO_2$ and $SiO_2$ were alternately put one on another to provide a mirror with a reflection factor of 98% or above. Further, a film of an indium-tin oxide (ITO) or the like may be used for the transparent electrodes 16, 16' and 16". In a case where the intensity of read light $L_W$ is too strong, an thin insulating light blocking film may be provided between the a-Si film 12 and the dielectric mirror 13 in order to completely block the read light reaching the photoconductive layer 12. A polydiacetylene film or a transition metal oxide of about 1 μm is a proper material for the light shielding film.

The operation of the embodiment having the above structure will be described below referring to FIGS. 5, 6A, 6B and 8.

With the polarization axes of the polarizer 7 and analyzer 8 being cross (cross Nicol), the read light $L_R$, becomes dark in the up state (corresponding to a state in which a negative voltage is applied) of the FLC 14, and becomes bright in the down state (corresponding to a state in which a positive voltage is applied). Even in the parallel Nicol state, pattern reading is possible, in which case the dark and bright states are reversed.

Figure 8:
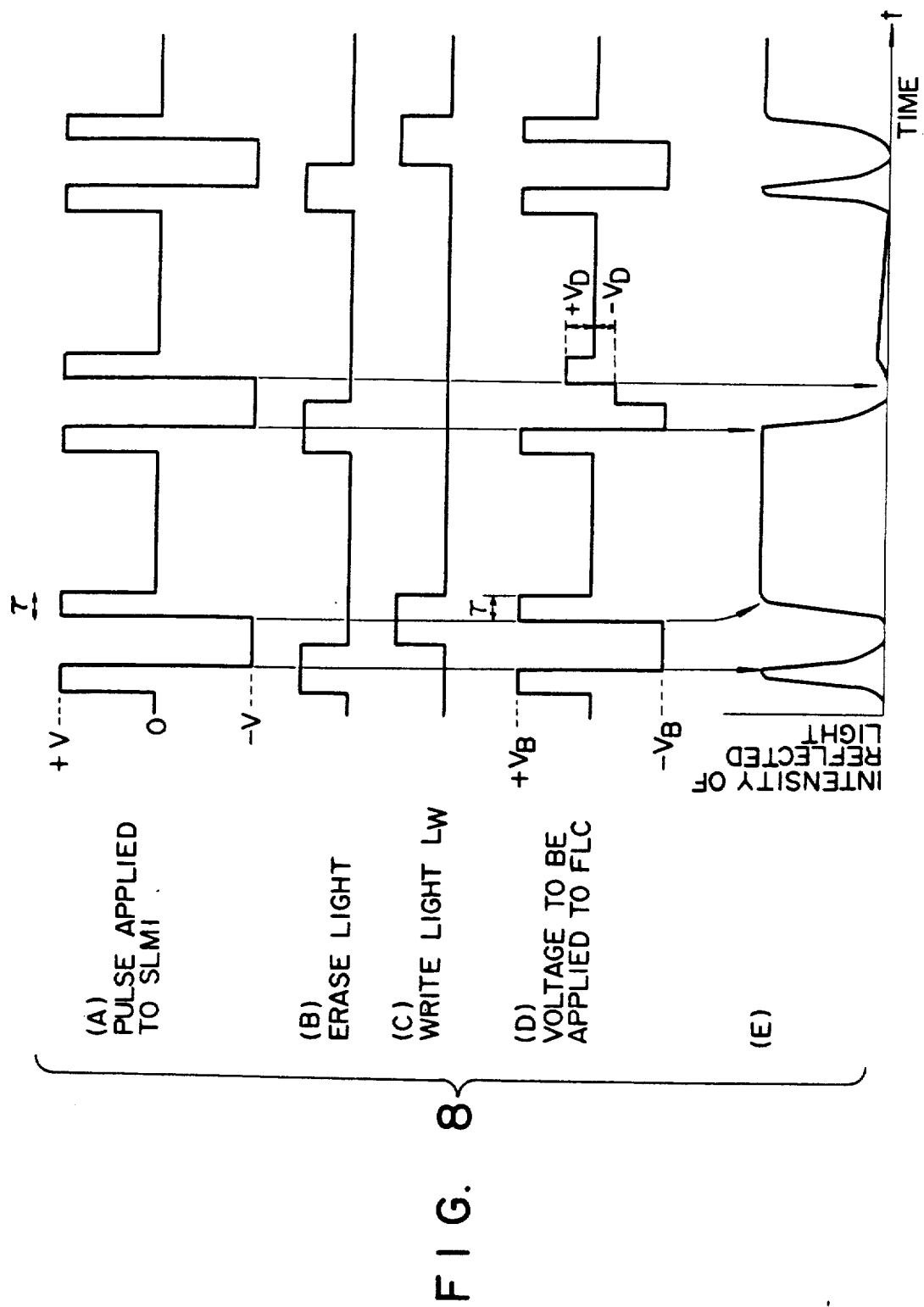
FIG. 8 is a waveform diagram illustrating a control pulse applied to the present SLM and its response operation.

The following description will be given with reference to the case of the crossed Nicol. FIG. 8 illustrates the control pulse supplied to the SLM 1 from the driving power source 4 and the intensity of the read light $L_R$. The FLC 14 used in this embodiment has such a property that if a product of the width $\tau$ of the pulse applied to the FLC 14 and the voltage Vf, $\tau \cdot Vf$, is equal to or smaller than a threshold value c (depending on the material for the FLC), the self-retaining property does not appear, but if the product exceeds the value c, the self-retaining property appears. When a control pulse of a voltage V as shown in FIG. 8A is supplied to the SLM 1 from the driving power source 4 and at the same time the erase light and write light are irradiated on the write surface of the SLM 1 in synchronization with the applied control pulse as shown in FIGS. 8B and 8C, a voltage applied to the FLC 14 would be as shown in FIG. 8D. In other words, a voltage applied to the FLC 14 upon irradiation of light becomes $+V_B$ or $-V_B$ as the resistance of the photoconductive layer 12 decreases, and a voltage applied to the FLC 14 when no light is irradiated becomes $+V_D$ or $-V_D$ as the photoconductive layer 12 has a high resistance. If the voltage V applied to the SLM 1 is set to satisfy the following relation with respect to the threshold value c $$|\tau \cdot V_B| > c > |\tau \cdot V_D|$$

the intensity of the reflected read light $L_R$, would be as shown in FIG. 8E and an output corresponding to the write light $L_W$ is attained. That is, applying a negative voltage in synchronization with the erase light pulse causes the voltage to be applied to the FLC 14 be $-V_B$ and the FLC 14 becomes an up state and is held in this state, so that the reading from the SLM 1 is set to the dark state. As the positive control pulse is then applied in synchronism with the write light pulse $L_W$, for that portion irradiated with the write light, the FLC 14 is kept at the down state and the read light $L_R$, is kept at the bright state. For that portion where the write light $L_W$ is not irradiated, $\tau \cdot V_D$ does not reach the threshold value and the FLC 14 is not therefore set at the down state, the read light $L_R$, remains in the dark state.

Reversing the positive and negative states of the waveform of the control pulse applied to the SLM 1 causes the negative pulse to be applied to that portion irradiated with the write light $L_W$, so that a read pattern becomes a write pattern inverted. According to the SLM 1 of the embodiment, it is possible to properly provide the normal or inverted output with respect to the write pattern by altering the positive and negative polarities of the voltage applied to the SLM 1.

In the actual experiment where the SLM 1 fabricated to have an effective area of about 1 cm² was operated with white light (0.5 mW/cm²) being the write light $L_W$, a He-Ne laser beam (2 mW/cm²) being the read light $L_R$ and the control pulse applied to the SLM 1 having a voltage of 15 V and a pulse width of 0.2 ms, the normal pattern and the inverted pattern could be read out at a contrast of 20:1 or above and a resolution of 30 lines/mm. The writing interval could be set to 30 minutes or greater.

Figure 9:
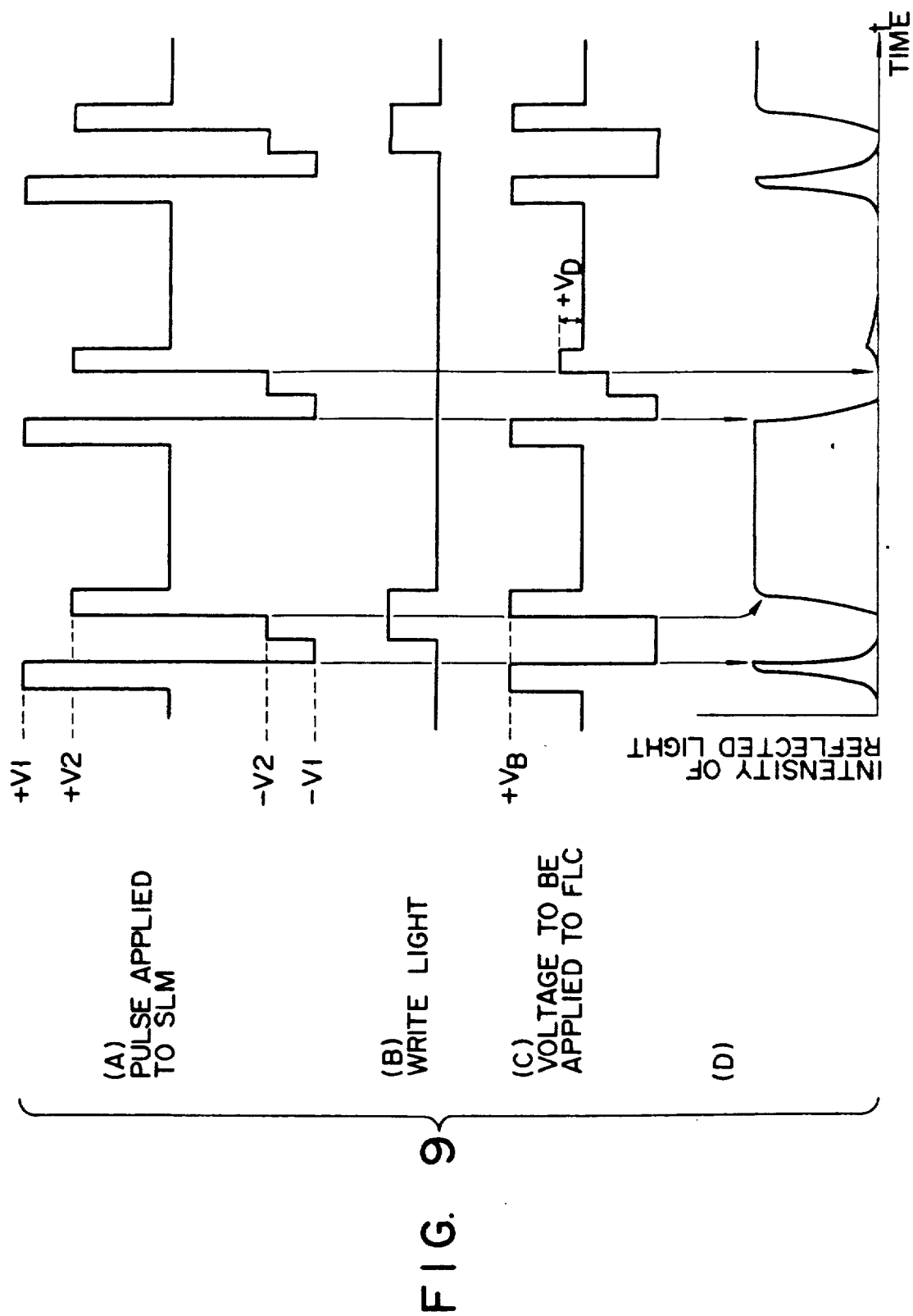
FIG. 9 is a waveform diagram showing a control pulse applied to the present SLM and its response operation in a case where an erasing light source is eliminated.

FIG. 9 illustrates another driving modes of a SLM which does not involve erase light. In this case, instead of using the erase light, a voltage $V_1$ applied to the SLM 1 for pattern erasing is set greater than a voltage $V_2$ applied at the time of pattern writing as shown in FIG. 9A. In other words, if the relation between $V_1$ and $V_2$ is so set as to cause the voltage applied to the FLC 14 corresponding to $V_1$ to be about equal to the voltage $V_B$ applied at the time of pattern writing, the state of the SLM 1 can be reset even if no erase light is used, and as shown in FIG. 9D, the SLM can be operated in the same manner as shown in FIG. 8E.

Although the waveform of the control pulse applied to the SLM 1 at the time of pattern erasing and writing is of a bipolar type in the above-described two operations, the same operation can be executed with a unipolar type. In this case, however, the operation is not so stable due to influence by accumulation of charges, which is a little undesirable from the operation point of view. As described above, the present invention can be applied in various manners and modified in various forms along the scope of this invention.

Figure 10:
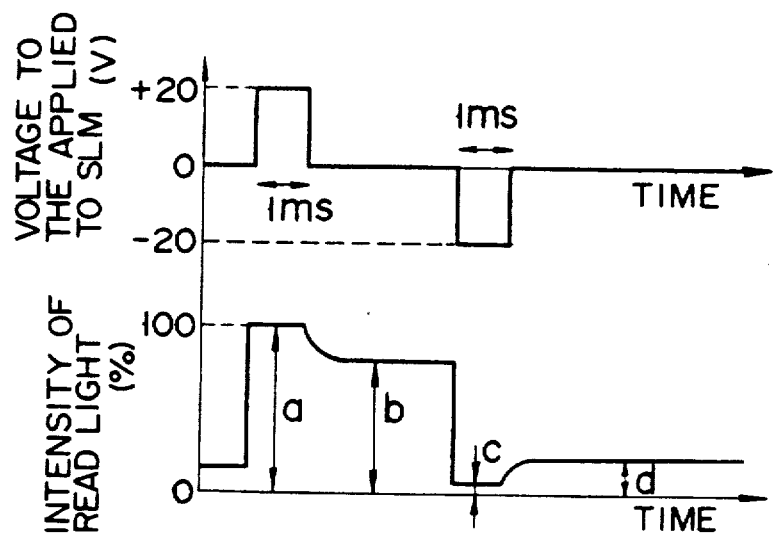
FIG. 10 is a diagram illustrating the relation between the intensity (%) of read light and a voltage (V) applied to the SLM with respect to time, which relation defines a memory ratio in the SLM.
Figure 11:
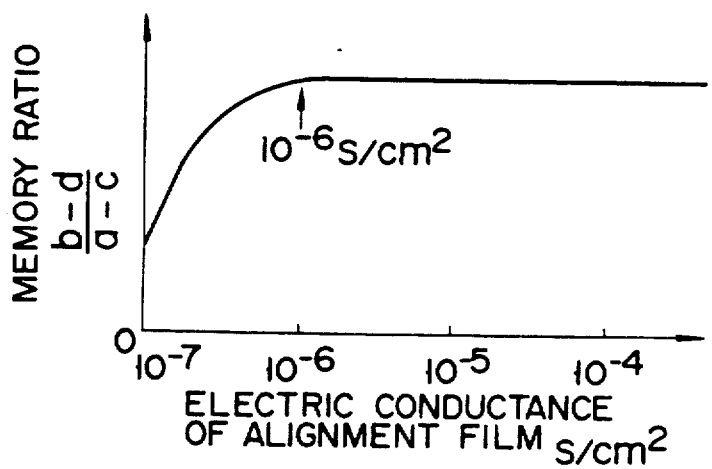
FIG. 11 shows the dependency of conductivity in a direction of a perpendicular of plane of an alignment film ($S/cm^2$) with respect to the memory ratio.
Figure 12:
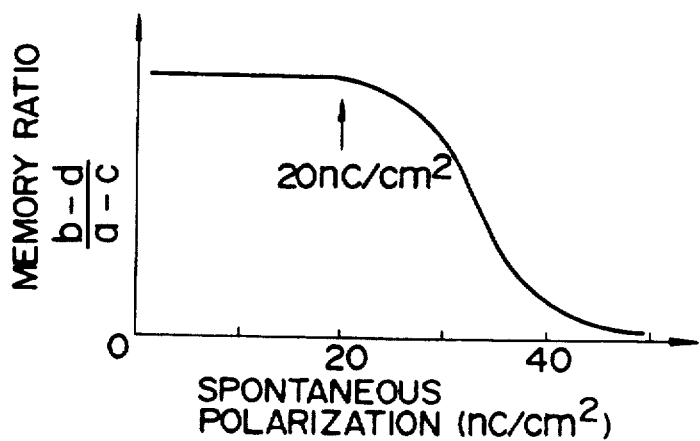
FIG. 12 shows the dependency of spontaneous polarization ($nC/cm^2$) with respect to the memory ratio.

For the present SLM to have a sufficient bistability, the alignment film and the FLC should satisfy the following conditions. The alignment film should have an electric conductance of $10^{-6}$ S/cm² or above in the direction perpendicular to the layer and the FLC should have spontaneous polarization of 20 nC/cm² or below. These are the conditions to prevent relaxation of polarization after a voltage pulse is applied. A description will now be given of the relation between the memory capability and the conductance of the alignment film or the spontaneous polarization of the FLC. The memory ratio is defined as shown in FIG. 10. Provided that a and c are respectively the light intensities of the read light when the write light is irradiated on the SLM and pulses of a voltage of $+20$ V and of $-20$ V, both with a 1 ms width and sufficiently exceeding the threshold value, b and d are respectively the light intensities of the read light in the memory state after application of a positive voltage and a negative voltage, and the memory ratio is defined to be (b-d)/(a-c), the dependency of the memory ratio on the electric conductance of the alignment film would be as shown in FIG. 11 and the dependency of the memory ratio on the spontaneous polarization would be as shown in FIG. 12. This could provide the aforementioned conditions of the electric conductance of the alignment film being $10^{-6}$ S/cm² or above and the spontaneous polarization of the FLC being 20 nC/cm² or below.

Other embodiments of this invention will be described below referring to FIGS. 13A, 13B, 15A, 15B, 16A and 16B.

In the embodiments described below, metal films arranged like islands are used together with, or in place of, the dielectric mirror as a reflection film that constitutes the SLM. Thus arranged metal films prevent electric conducting in the direction in the face at the time of pattern writing to ensure writing of a two dimensional pattern with a predetermined resolution. Further, at the time of pattern reading, the read light can be reflected and be shielded from reaching a photoconductive layer that is sensitive to the write light, thereby realizing a stable and good input/output characteristic even when the intensity of the read light is large. Accordingly, this SLM can be used for image conversion, image display and an optical memory.

FIGS. 13A and 13B illustrate the structure of a SLM according to another embodiment, the former being a top view showing a pattern of electrodes and metal films and the latter being a side view. Referring to the diagrams. 1A is one glass substrate, and 2A is another glass substrate. Formed on the glass substrate 1A are a transparent electrode 3A, a photoconductive layer 4A formed on the transparent electrode 1A and sensitive to write light, a dielectric mirror 5A formed on the photoconductive layer 4A, metal light shielding films 11A as metal films deposited on the dielectric mirror 5A for reflecting read light and shielding light going to the photoconductive layer 4A, and an alignment film 6A formed to cover both the dielectric mirror 5A and the light shielding films 11A. Formed on the other glass substrate 2A are a transparent electrode 7A and an alignment film 8A deposited on the transparent electrode 7A. The glass substrates 1A and 2A are arranged so that their alignment films 6A and 8A face each other with a spacer 9A in between. Reference numeral 10A is a FLC filled in a gap with a given size caused by the spacer 9A, 12A is a transparent electrode formed at an edge portion on the glass substrate 1A as separate from the transparent electrode 3A, 13A is a silver paste layer for electrically connecting this electrode 12A to the transparent electrode 7A on the glass substrate 2A, 14A is a sealing member for sealing and securing the overall FLC, 15A is a lead electrode connected to the transparent electrode 3A on the glass substrate 1A, and 16A is a lead electrode connected to the transparent electrode 12A on the other glass substrate 2A. A predetermined driving voltage is applied to the FLC 10A via the lead electrodes 15A and 16A. An indium-tin oxide (ITO) film may be used as the transparent electrodes 3A, 7A and 12A. The SLM 20A according to this embodiment is constituted in the above manner. It should be noted that the same reference numerals as used in FIG. 6B are used in FIG. 13B to specify the corresponding or identical elements, and their description will therefore be emitted.

In FIG. 13B, for example, an aluminum having a thickness of 2000 angstroms may be used as the metal light blocking films 11A. In order to avoid generation of electric conductance in the direction in the face due to the employment of the light blocking films 11A, the aluminum film is etched with a mesh pattern so as to leave aluminum film islands. More specifically, after aluminum is uniformly evaporated, a pattern having a $18 \times 18$ $\mu$m size and islands arranged at intervals of 2 $\mu$m, for example, is formed by a photolithography. Assuming that the number of the pixels of the SLM is 250,000 per 1 cm$^2$, the above pattern size can provide a sufficient resolution.

Besides aluminum, titan or gold can also be used as a material for the metal light blocking films 11A.

The operation of thus constituted embodiment will be described below.

FIGS. 14A to 14D present illustrations for explaining the operation of the SLM of this embodiment. Referring to the diagrams, 20A is a SLM, 1A is a glass substrate serving as one transparent substrate, and 2A is also a glass substrate serving as another transparent substrate which have already been described. Description will now be given referring to FIGS. 13A and 13B. The FLC 10A filled in the SLM 20A has its alignment direction changed by an electric field and retained when a product of a voltage Vf applied to the FLC 10A and its pulse width $\tau$, Vf·$\tau$, exceeds a given threshold value c, and retains the previous alignment direction if the product does not exceed the value c. Although the applied voltage is divided by the photoconductive layer 4A, dielectric mirror 5A and FLC 10A in the SLM 20A, the optical characteristic of the SLM 20A can be controlled by the write light (or erase light) L$_W$ due to the photoelectric conducting effect of the photoconductive layer 4A if the product Vf·$\tau$ is set greater than the threshold value c. FIG. 14A illustrates a case where the write light (or erase light) L$_W$ is irradiated on the face of the glass substrate 1A of the SLM 20A and a voltage $+V$ is applied, to align the FLC 10A in the direction (down state) inclined at 45 degrees from the normal direction, the linearly polarized read light L$_{R1}$ has its polarization direction rotated by 90 degrees and is reflected as L$_{R2}$. In a case where the write light is not irradiated and a voltage $+V$ is applied as in FIG. 14B, the FLC 10A shows no status change and the read light L$_{R2}$ to be reflected retains the previous status. In a case where the write light is irradiated and a voltage $-V$ is applied as in FIG. 14C, the FLC 10A is applied with a voltage exceeding a negative threshold value so as to be in the up state and the linearly polarized read light L$_{R1}$ is read with the polarization left unchanged. FIG. 14D illustrates a case where the write light is not irradiated and a voltage $-V$ is applied, in which case the read light L$_{R2}$ to be reflected retains the previous state a in the case of FIG. 14B.

In reading a pattern based on the above principle, the read light L$_{R1}$ is polarized by the polarizer and the read light L$_{R2}$ to be modulated and reflected by the SLM 20A is read out through the analyzer. Based on this principle, with the polarization axes of the polarizer and analyzer being cross (cross Nicol) the read light becomes dark in the up state (corresponding to a state in which a negative voltage is applied) of the FLC, and becomes bright in the down state (corresponding to a state in which a positive voltage is applied). Even in the case of the polarization axes of the polarizer and analyzer being parallel to each other (parallel Nicol), the dark and bright states are reversed.

According to this embodiment, at the time of pattern reading, the metal light blocking films 11A shield light to the photoconductive layer 4A as well as reflect the read light L$_{R1}$. In other words, this embodiment utilizes a good light shielding property of metal films to compensate the reflection factor of the dielectric mirror 5A and shield the read light reaching the photoconductive layer 4A when the intensity of the read light is large. This ensures a stable and excellent reading reflection factor irrespective of the magnitude of the intensity of the read light, high or low. Since the metal light blocking films 11A are arranged like islands (insulated from one another in a mesh form), the potential of a pattern sensed by the photoconductive layer 4A can be applied to the FLC 10A at a given resolution to ensure pattern writing.

FIGS. 15A and 15B are input/output characteristic diagrams showing the above operation in this embodiment. In both diagrams, the horizontal scale represents the intensity of write light, and the vertical scale the reading reflection factor after light passes the analyzer. More specifically, FIG. 15A presents measurements in the case of crossed Nicol (the polarization axes of the polarizer and analyzer being crossed), and FIG. 15B measurements in the case of parallel Nicol (these polarization axes being parallel to each other); the solid line 1 indicates a curve of a change in the reading reflection factor when the intensity of the read light is low, while the broken line 2 indicates a curve of a change in the reading reflection factor when the intensity of the read light is high. FIGS. 15 and 15B both illustrate that the plane of polarization of the read light is rotated 90 degrees with the write state at a given write intensity being a transitional point. It should be noted from the diagrams that the write intensity at the transitional point hardly varies irrespective of the magnitude of the read intensity due to the influence of the metal light shielding films 11A. In other words, the input/output characteristic is stable and good.

In the actual experiment where the SLM 1 fabricated to have an effective area of about 1 cm$^2$ was operated with white light (0.5 mW/cm$^2$) being the write light, an Ar laser beam (100 mW/cm$^2$) being the read light and the control pulse applied to the SLM having a voltage of 15 V and a pulse width of 0.2 ms, the normal pattern and the inverted pattern could be read out at a contrast of 20:1 or above and 500×500 pixels. This indicates that the use of the metal light shielding films 11A prevents part of the read light from reaching the photoconductive layer 4A even if the read light used has an intensity 200 times that of the write light. The writing interval could be set to 30 minutes or greater.

In the above embodiment, if the metal light shielding films 11A are made thicker as shown in FIG. 16 to improve the reflection factor, the films 11A alone can sufficiently serve as the reflection film, thereby eliminating the need for the dielectric mirror 5A. In this case, the fabrication process would be easier. Further, the order of laminating the dielectric mirror and metal light shielding films may be changed so that the transparent electrode 3A, photoconductive layer 4A, metal light shielding films 11A, dielectric mirror 5A and alignment film 6A are laminated in the named order on the glass substrate 1A.

Figure 17:
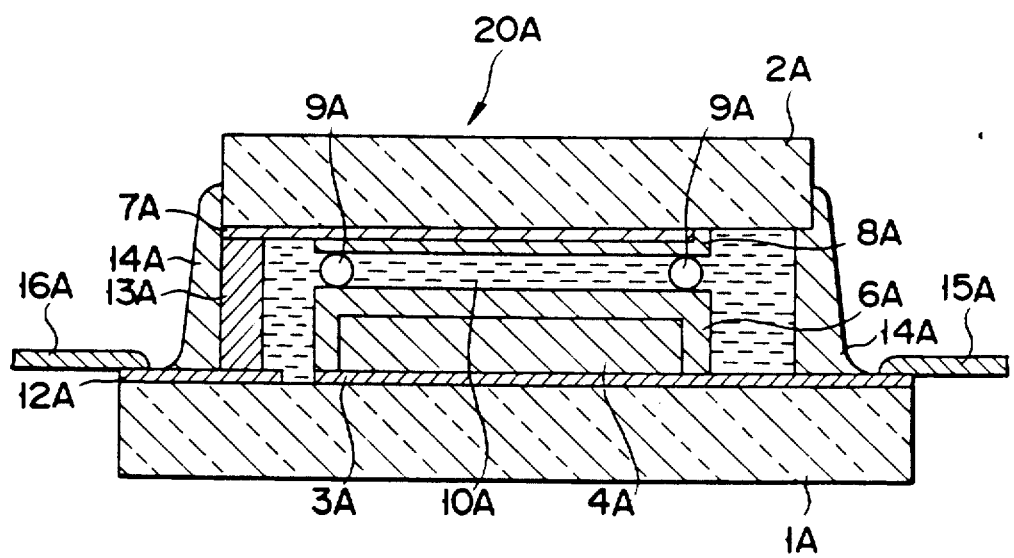
FIG. 17 is a cross sectional view illustrating a further modification of the present SLM, which has no reflection film.

Alternately, as shown in FIG. 17, both the metal light shielding films 11A and dielectric mirror 5A may be eliminated from the structure shown in FIG. 13A. In this case, about 30% reflection occurs at the screen of the photoconductive layer 4A and alignment film 6A.

It should be noted that the same reference numerals as used in FIG. 13B are used in FIGS. 16 and 17 to specify the corresponding or identical elements, and their description will therefore be omitted.

Figure 21:
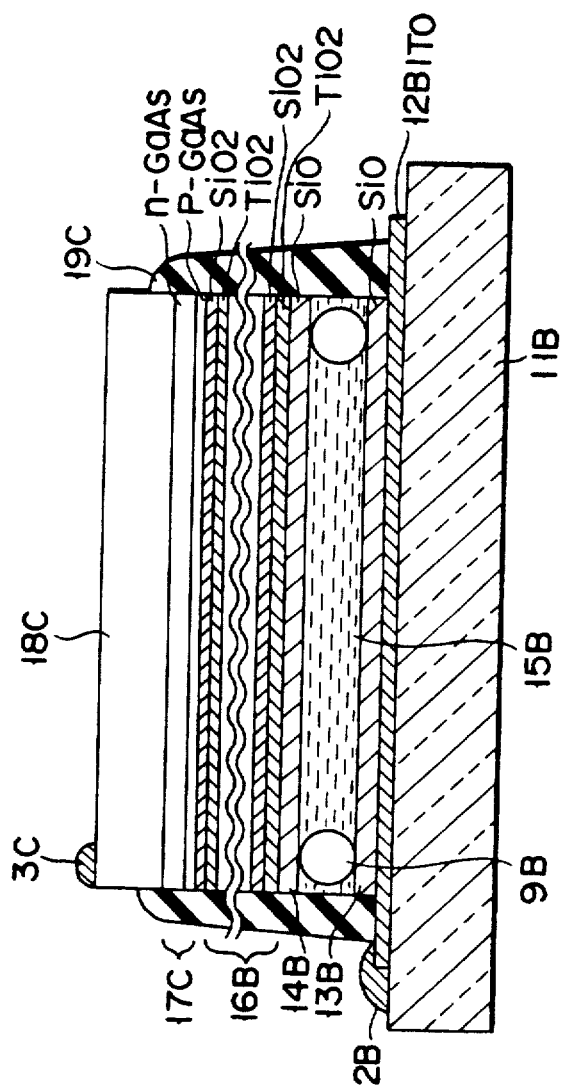
FIG. 21 is a cross sectional view illustrating a modification of the SLM shown in FIGS. 18A and 18B which has a photodiode deposited on a semiconductor substrate.

Another embodiment of the present SLM and spatial light modulating apparatus will be described below referring to FIGS. 18A, 18B and 21.

In this embodiment the dielectric mirror and liquid crystal alignment film are deposited on a semiconductor substrate having a photodiode structure, and no erase pulse source is needed, and the present device can be operated in a long-wave band, thus eliminating the need to write a pattern with a gas laser. This embodiment is therefore suitable in providing compact SLM.

FIGS. 18A through 18C present detailed illustrations of a SLM according to the above embodiment. As a spatial light modulating apparatus employing this SLM can be illustrated in the same manner as the one in FIG. 5, its description will be omitted.

Referring to FIGS. 18A and 18B, reference numeral 11B is a glass substrate, 12B is a transparent electrode, 13B and 14B are alignment films for determining the alignment axis of liquid crystal molecules, 9B is a spacer for maintaining the gap between substrates, 15B is a FLC, 16B is a dielectric mirror, 17B is a photodiode deposited on a semiconductor substrate 18B, 19B is a sealing member for preventing water absorption and oxidization of the modulator, and 2B and 3B are lead electrodes. In the fabrication process, the transparent electrode 12B of an indium tin oxide (ITO) was formed on the glass substrate 11B on the reading side through sputter vaporization, and the alignment film 13B was formed by an oblique evaporation film (300-angstrom thick) of a silicon oxide (SiO). A polished indium phosphorus (InP) wafer was used for semiconductor substrate 18B on the reading side, a photodiode having a pn junction or pin junction was formed on the substrate. The dielectric mirror 16B was formed on the resultant structure, then the alignment film 14B made of the SiO oblique evaporation was formed on the dielectric mirror. The alignment films 13B and 14B may be formed by rubbing of a thin polyimide film. The gap between these alignment films is defined by the spacer 9B and the FLC 15B is filled in the gap.

It should be noted that the FLC 15B in the above structure has a tilt angle of about 22.5 degrees and has a good self-retaining property. To improve the self-retaining property, the FLC 15B should have a small spontaneous polarization preferably of 20 nC/cm² or less. The aligned state of the FLC 15B will be described with reference to FIGS. 7A and 7B which have been referred to in the foregoing description of the embodiment shown in FIGS. 5, 6A and 6B. A 200-angstrom thick SiO film formed by the oblique evaporation was used for the alignment films 13B and 14B and aligning angle of the alignment films was set to be in the direction of 22.5 degrees with respect to the polarization axis P of the polarizer on the light incident side. The molecules of the FLC 15B are aligned in the same direction as the polarizer's polarization axis P (up state (FIG. 7A)) or in the direction declined 45 degrees to the axis P (down state (FIG. 7B)) in accordance with the direction of an electric field of the control pulse. In the up state, the light entering the FLC 15B through the polarizer 7 (FIG. 5) and reflected therefrom returns with the original polarization state maintained. In the down state, the plane of polarization of the returning light is rotated due to the refractive index anisotropy of the FLC 15B. If the thickness d of the FLC 15B is set to be $$d = m \cdot \lambda / (4 \cdot \Delta n)$$

where $m = 1, 3, 5, \ldots$, $\lambda$ is the wavelength of read light and $\Delta n$ is the difference between parallel and perpendicular refractive indexes of the molecules of the FLC, the plane of polarization of the returning light is rotated 90 degrees. In order to improve the self-retaining property of the FLC 15B as well as the response speed, it is desirable to form the FLC 15B as thin as possible. In this respect, it is desirable to set $m = 1$. Normally, d is about 2 μm, and to maintain the uniform thickness, spherical particles or rod-shaped insulation particles of an equal size are dispersed as the spacer 9B in the FLC 15B.

As a photosensitive layer on the write side in the embodiment, as shown in FIGS. 18B and 18C, an ohmic electrode was provided on the top of the n type InP substrate 18B, with a silicon (Si) doped n-InGaAs layer, beryllium (Be) doped P-InGaAs layer being sequentially deposited on the bottom to thereby form the photodiode 17B. During operation, a reverse bias is applied at the time of pattern writing while a forward bias is applied at the time of pattern erasing. Alternately, a GaAs based or Si based photodiode may be used as the photosensitive layer on the write side, so that a wider range of a write wave band becomes available by properly selecting the substrate and the photodiode. The dielectric mirror 16B having a reflection factor of 98% was attained by alternately laminating 14 layers of TiO₂ and SiO₂ one on another, which have a thickness to set the optical length n·d to be ¼ of the wavelength of the read light.

The operation of thus constituted embodiment will be described below referring to FIGS. 5, 7A and 7B. With the polarization axes of the polarizer 7 and analyzer 8 being cross (cross Nicol), the read light $L_r$, becomes dark in the up state (corresponding to a state in which a negative voltage is applied) of the FLC 15B, and becomes bright in the down state (corresponding to a state in which a positive voltage is applied). Even in the parallel Nicol state, pattern reading is possible, in which case the dark and bright states are reversed.

Figure 20A:
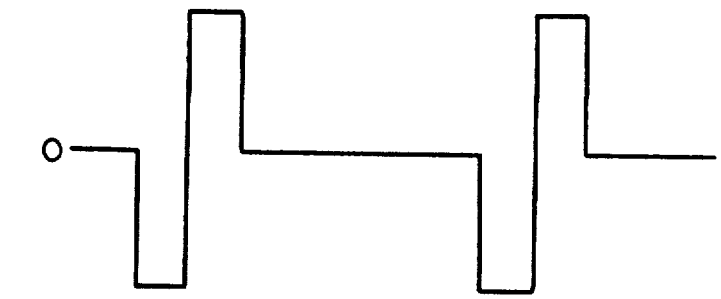
FIGS. 20A through 20D are diagrams illustrating the relation between timing charts of a voltage pulse applied to the SLM and a write light pulse when the equivalent circuit shown in FIGS. 19A to 19C is operated, and the intensity of read light.
Figure 20B:
Figure 20C:
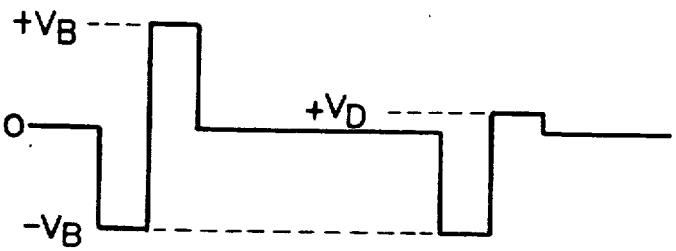
Figure 20D:
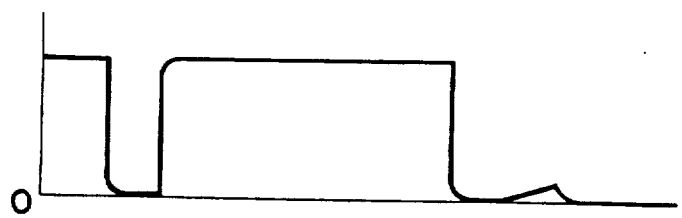

The description of the operation will be given referring to FIGS. 19A to 19C which illustrate an equivalent circuit of the SLM 1 and a voltage applied to the FLC 15B. If a product of the width $\tau$ of the pulse applied to the FLC 15B and the voltage Vf, $\tau \cdot Vf$, is equal to or smaller than a threshold value c (depending on the material for the FLC), the self-retaining property does not show, but if the product exceeds the value c, the self-retaining property shows. In order to obtain the proper switching, therefore, it is necessary to set $\tau$ to satisfy $$|\tau \cdot V_B| > c > |\tau \cdot V_D|$$

where $V_B$ is a voltage at the time light is irradiated and $V_D$ is a voltage when no light is irradiated. FIG. 19A is a diagram for explaining pattern erasing. A voltage $-V$ is applied to the SLM 1, that is, the photodiode 17B is in a forward bias state, so that most $(-V_B)$ of the voltage is applied to the FLC 15B irrespective of the presence or absence of the write light. As a result, the FLC molecules come to the up state as shown in FIG. 7A and the read light $L_r$ becomes dark. FIG. 19B is a diagram for explaining pattern writing when there is the write light $L_W$. A voltage $+V$ is applied to overall the SLM 1, i.e., a photocurrent flows even though the photodiode 17B is in a reverse bias state, thus providing a low impedance. Accordingly, most of the voltage, $+V_B$, is applied to the FLC 15B irrespective of the presence or absence of the write light As a result, the FLC molecules come to the down state and the read light $L_r$, becomes bright. Since only a leak current flows through the photodiode 17B under the reverse bias state unless write light $L_W$ is irradiated as shown in FIG. 19C, only $+V_D$ is applied to the FLC 15B. Therefore, the up state at the time of the pattern erasing is maintained. FIGS. 20A to 20D illustrate the timings of the voltage pulse and writ light pulse applied to the SLM 1 from the driving power source 4, and the dynamic behavior of the intensity of the output light $L_r$, (read light). When the control pulse of a voltage V as shown in FIG. 20A is applied to the SLM 1 from the driving power source 4 and the write light is irradiated on the writing face of the SLM 1, as shown in FIG. 20B, a voltage applied to the FLC 15B in the SLM 1 would be as shown in FIG. 20C while the intensity of the read light $L_r$, would be as shown in FIG. 20D. It should be understood from the diagrams that the present SLM not only performs light modulation by the write light but also keep write optical information accumulated even after the voltage and optical pulse are both removed until the next erase pulse is applied.

In the actual embodiment where the SLM 1 fabricated to have an effective area of about 1 cm$^2$ was operated with a laser beam from a laser diode (wavelength of 1.5 μm) having a InGaAsP layer as an active layer was used as the write light $L_W$ and read light $L_r$ and a control pulse applied to the SLM 1 having a voltage of ±10 V and a pulse width of 500 μsec, a pattern could be read out at a contrast of 50:1 or above and a resolution of 50 lines/mm. Information could be stored more than one day.

In the embodiment described above, an InGaAs based junction type photodiode was formed as a SLM on an InP substrate. FIG. 21 illustrates only a SLM having a GaAlAs layer as a semiconductor substrate according to another embodiment of this invention. As a semiconductor substrate 18C, n-GaAlAs was used and n-GaAs and p-GaAs were grown as a junction type photodiode 17C on the substrate. Although the method of driving the SLM and the structure thereof are the same as those explained in the description of the previous embodiment, the us of the pn junction of GaAs as the photodiode 17C can provide a SLM having a sensitivity to a near infrared range around 800 nm. As the same reference numerals as used in FIG. 18B are also used in FIG. 21 to specify corresponding or identical elements, their description will be omitted.

As should be clear from the foregoing description, since this embodiment employs a FLC and a photodiode, it has advantages such as requiring no erase light and ensuring spatial modulating operation with a memory function. This embodiment can therefore apply to image conversion, image processing, an optical memory, etc. Further, according to this invention, the wavelength of the write light can be selected as needed according to applications by properly selecting the structure of the photodiode and the substrate.

A further embodiment of the present SLM and the present spatial light modulating apparatus will be described below referring to FIGS. 22 to 24A through 24C.

In this embodiment, a FLC having a self-retaining property is used and the polarity, voltage and applying time of an applied voltage pulse as well as the timing of the read light are changed, thus permitting selection of gradation to be programmable and permitting an intermediate gradation display.

Since the structures of the SLM and spatial light modulating apparatus according to this embodiment are the same as those shown in FIGS. 5, 6A and 6B, their description will be omitted.

The operation of this embodiment will be now described.

With the polarization axes of the polarizer 7 and analyzer 8 being cross (cross Nicol), as shown in FIG. 5, the read light $L_R$, becomes dark in the off state (corresponding to a state in which a negative voltage is applied) of the FLC 14, and becomes bright in the on state (corresponding to a state in which a positive voltage is applied). The on and off states respectively correspond to the states shown in FIGS. 22A and 22C. Even in the parallel Nicol state, pattern reading is possible, in which case the dark and bright states are reversed.

The description of the operation will be given. First, the applied voltage pulse and self-retaining property of the FLC will be described. If a product of the width $\tau$ of the pulse applied to the FLC 15B and the voltage Vf, $\tau \cdot Vf$, is equal to or smaller than a threshold value c (depending on the material for the FLC), the self-retaining property does not show, but if the product exceeds the value c, the self-retaining property shows. In order to realize a sufficient memory capability, therefore, it is necessary to set $\tau$ to satisfy $$\tau \cdot V_B > c$$

where $V_B$ is a voltage at the time light is irradiated. If the equation is not satisfied, for example, if Vf is not sufficiently large with respect to $\tau$, although the FLC is switched slow during application of an electric field, the voltage pulse does not reach the threshold value c. If the electric field is eliminated, therefore, the present state would not be maintained and it is relaxed again to the original state. This relaxation is slower than the switching caused by the application of the electric field, so that properly setting the timing for the read light can provide an intermediate gradation display.

Figure 22:
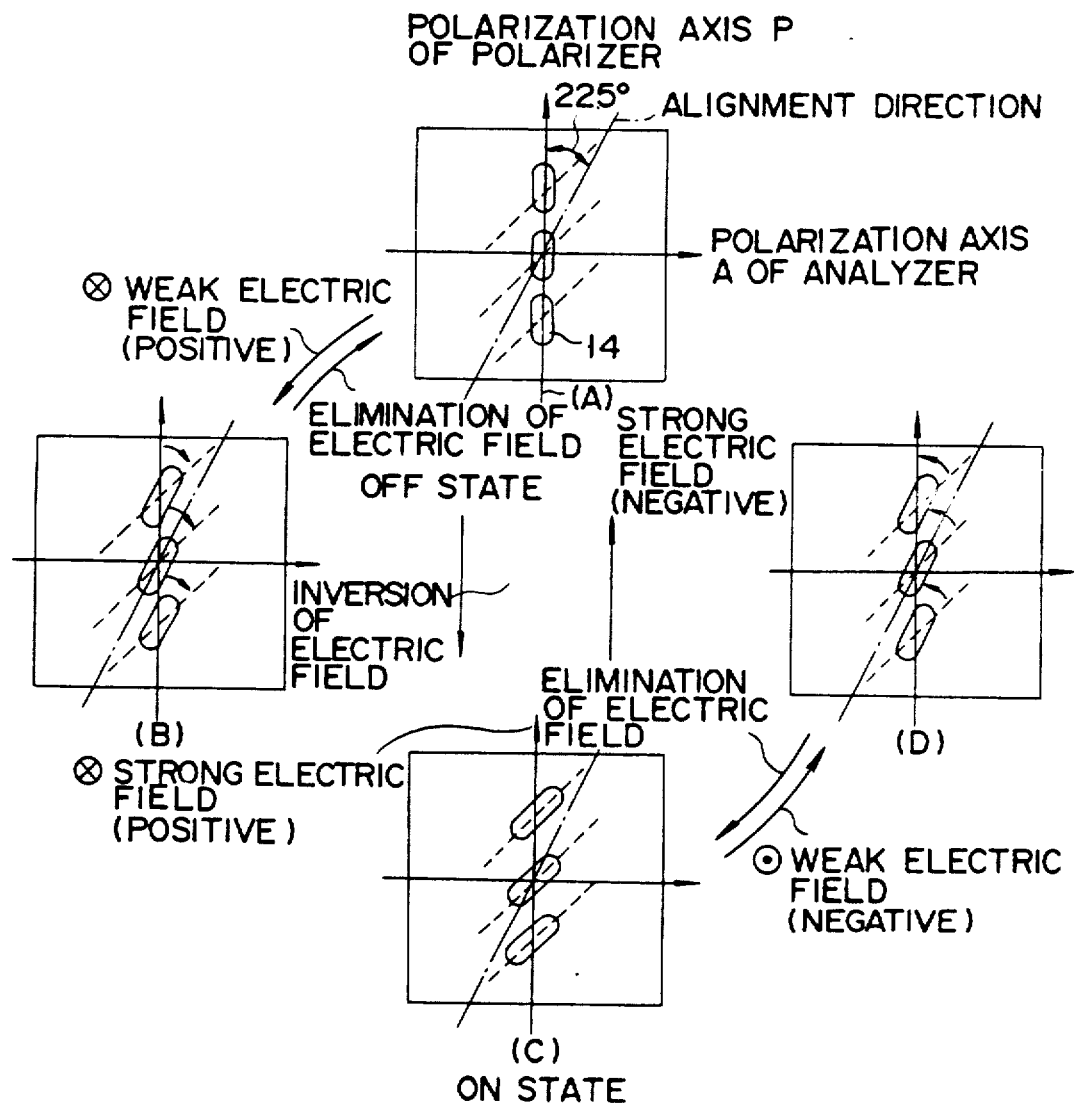
FIG. 22 is a diagram illustrating the relation between a voltage applied to the FLC and the aligning direction for explaining the intermediate gradation display in the present SLM and the present spatial light modulating apparatus using a photoconductive film as a photosensor.
Figure 23:
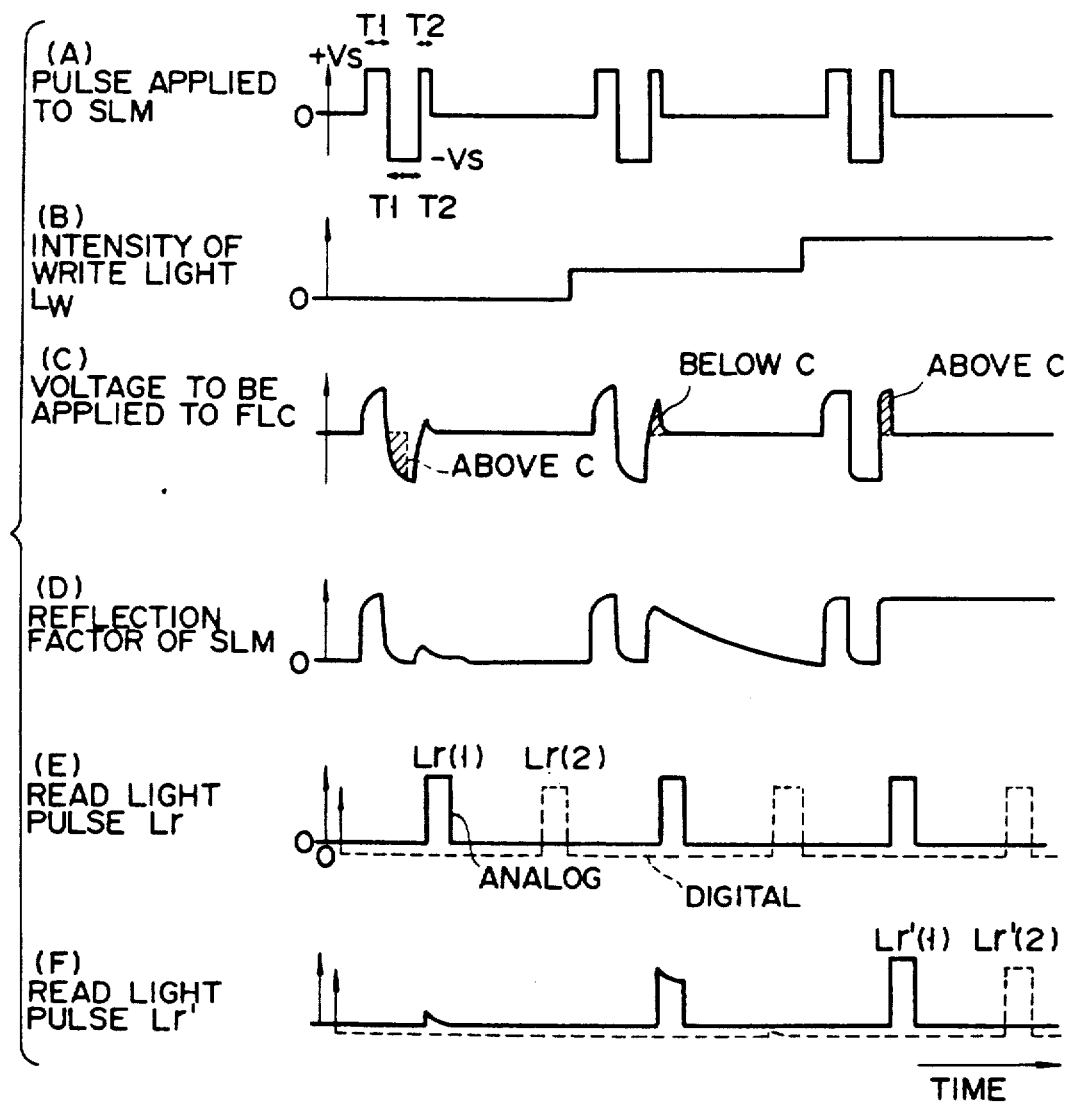
FIG. 23 is a time chart for explaining the operation for ensuring the intermediate gradation display by feeble electric field control.

The operation for providing an intermediate gradation display by the FLC will now be described in detail referring to FIGS. 22 and 23. FIG. 22 illustrates the relation between a voltage applied to the FLC 14 and the alignment direction. In FIG. 22, (A) through (D) respectively show the time of a negative voltage being applied, the time of a positive voltage being applied, the time of a weak positive voltage being applied, and the time of a weak negative voltage being applied. A description will be given below of a mode in which initialization is executed with a negative voltage, pattern writing is executed with a positive voltage, and the crossed Nicol reading is executed. The molecules of the FLC 14 are aligned to be in parallel to the polarizer's polarization axis by applying the negative voltage shown in (A) in FIG. 22 and the output light is turned off. At this time, the voltage pulse is set to have a voltage level and a pulse width equal to or greater than a threshold value c, and the off state is kept due to the self-retaining property after the pulse is eliminated. When a voltage pulse with the opposite polarity which exceeds the threshold value c is applied, the FLC is switched to the state as shown in (C) in FIG. 22 and is kept at that state. An intermediate gradation expression by the FLC can be realized by applying a voltage pulse with a level less than the threshold value c and reading a pattern at the proper time. In other words, if the FLC is initialized to the state shown in (A) in FIG. 22 and a weak electric field having a level less than the threshold value is applied as shown in (B) in FIG. 22, the molecules of the FLC 14 are going to be turned on during voltage application but are relaxed to the off state because the pulse is insufficient for self-retaining property. The intermediate gradation can be provided if a pattern is read only during the relaxation. Further, an inverted intermediate gradation display can be provided by initializing the FLC to the on state a shown in (C) in FIG. 22 and writing a pattern with a positive weak electric field.

According to this invention, a weak electric field for providing an intermediate gradation display can be controlled by the write light $L_W$. (A) to (F) in FIG. 23 illustrate applied pulses which can provide an intermediate gradation display; (A) illustrating a voltage applied to the SLM 1, (B) the intensity of the write light $L_W$, (C) a voltage applied to the FLC layer in the SLM, (D) a reflection factor of the SLM at the time of the crossed Nicol, (E) read light pulse $L_r$, and (F) read light pulse $L_r'$. A voltage pulse to the SLM 1 and a pulse modulation signal to a read light source 9 are supplied from the driving power source 4. In this embodiment, although direct modulation light from a laser diode is used as read light $L_r'$ from the read light source 9, light from a halogen lamp, which is modulated by a liquid crystal shutter or a chopper, may be used as the read light. The diagram illustrates applied pulses for three cycles, or the responses with the write light $L_W=0$, 50 and 100 $\mu W/cm^2$ in the first, second and third cycles. In (A) in FIG. 23, the pulse to the SLM (voltage: $-V_s$; time: T1) corresponds to the initialization, and the pulse (voltage: $+V_s$, time: T2) to the pattern writing. The pulse (voltage: $+V_s$; time: T1) and the pulse (voltage: $-V_s$; time: T2) preceding to those pulses have the opposite polarities and the same voltage levels and exist at the same times as the mentioned pulses corresponding to the initialization and pattern writing, respectively. The latter two pulses are intended to prevent deterioration of the FLC due to application of a DC component. Although a driving method using no erase light has been described in the foregoing description of this embodiment, an erase light pulse may be applied in synchronism with an initializing electric pulse. In this case, it is possible to reduce the erase voltage or shorten the erasing time. As shown in (C) in FIG. 23, for Vs and T1, the pulse applied to the FLC layer should exceed the threshold value c even with $L_W=0$ $\mu W$ $cm^2$. With regard to Vs and T2, the voltage applied to the FLC layer is set such that it exceeds c only when $L_W(=100$ $\mu W/cm^2$, for example) is sufficiently large and falls below c otherwise. The reflection factor of the SLM 1 in each cycle is illustrated in (D) in FIG. 23. The reflection factor hardly increases even at the time of pattern writing in the first cycle, it is relaxed to the off state after some increment in the second cycle, and it is saturated and is kept at the on state due to the self-retaining property in the third cycle. At this time, using a read light pulse corresponding to $L_r(1)$ in (E) in FIG. 23 can provide an intermediate gradation with a good linearity as of $L_r'$ in (F) in FIG. 23, while using a read light pulse corresponding to $L_r(2)$ causes the output to be modulated as shown in $L_r'(2)$ to be subjected to heavy binarization (threshold value process).

Figure 24A:
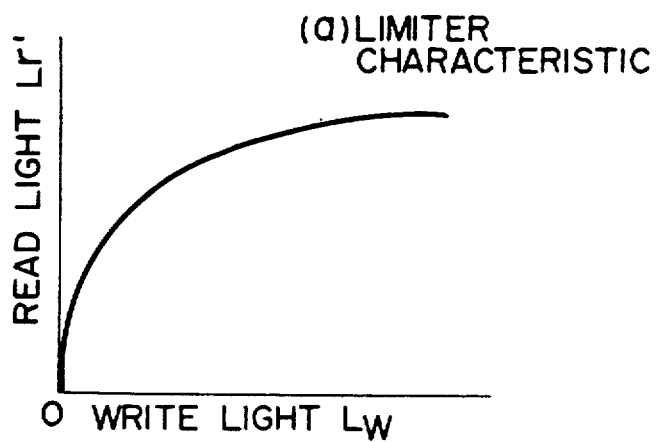
FIGS. 24A through 24C are characteristic diagrams illustrating that the limiter characteristic, linear characteristic and threshold value characteristic can be controlled by timing control of read light, respectively.
Figure 24B:
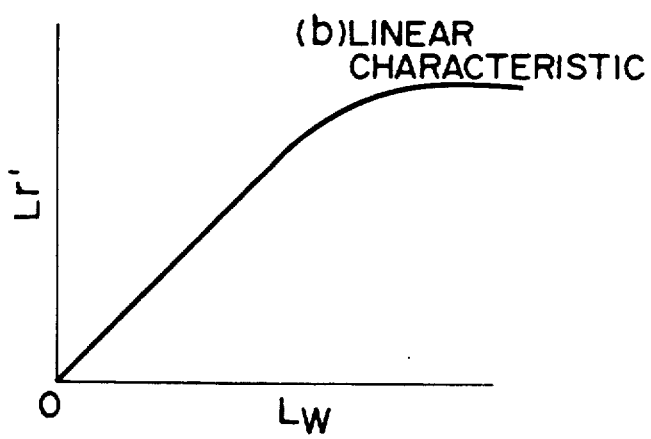
Figure 24C:
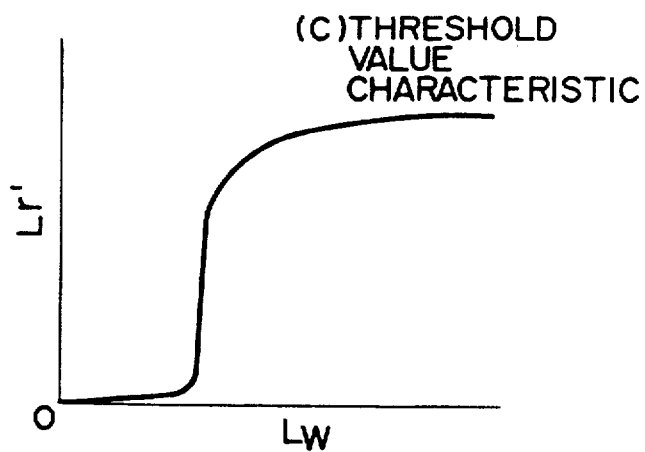

In the actual embodiment where the SLM 1 fabricated to have an effective area of about 1 cm$^2$ was operated with light from a white light source such as a halogen lamp being used as the write light $L_W$ and a laser beam from a helium neon laser (wavelength of 633 $\mu m$) being used as the read light $L_r$, and a control pulse applied to the SLM 1 (voltage of $\pm 20$ V; time T1 = 1 ms; and time T2 = 200 $\mu s$), a pattern could be read out at a contrast of 50:1 or above and a resolution of 50 lines/mm. At this time, changing the timing of the read light $L_r$ could provide the limiter characteristic, linear characteristic and threshold value characteristic as shown in FIGS. 24A to 24C.

As should be understood from the foregoing description, according to the above embodiment, a FLC having a self-retaining property is used in the SLM and the polarity, voltage and the time for an applied pulse as well as the timing for the read light are changed, thus ensuring arbitrary selection of the display mode, negative or positive, and arbitrary selection of gradation, the threshold value characteristic or the limiter characteristic. This embodiment can therefore be applied in a wide range of fields, such as a display and image processing.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A spatial light modulator comprising:
    a photoconductive film deposited on one glass substrate having a transparent electrode;
    a first liquid crystal alignment film deposited on said photoconductive film;
    a second liquid crystal alignment film deposited on another glass substrate having another transparent electrode; and
    a ferroelectric liquid crystal filled between said first and second liquid crystal alignment film;
    wherein said first and second liquid crystal alignment films have an electric conductance of $10^{-6} S/cm^2$ or above in a direction perpendicular to a plane of the films.

2. A spatial light modulator according to claim 1, wherein said ferroelectric liquid crystal is a chiral smectic liquid crystal having a spontaneous polarization of less than 20 nC/cm$^2$.

3. A spatial light modulator according to claim 1, further including reflection film means sandwiched between said photoconductive film and said first liquid crystal alignment film.

4. A spatial light modulator according to claim 3, wherein said reflection film means comprises a dielectric mirror.

5. A spatial light modulator according to claim 3, wherein said reflection film means comprise metal light blocking films arranged like islands.

6. A spatial light modulator according to claim 3, wherein said reflection film means includes a laminated body comprising a dielectric mirror and metal light blocking films.

7. A spatial light modulating apparatus comprising:
a spatial light modulator having
a photoconductive film deposited on one glass substrate having a transparent electrode;
a first liquid crystal alignment film deposited on said photoconductive film;
a second liquid crystal alignment film deposited on another glass substrate having another transparent electrode;
a ferroelectric liquid crystal filled between said first and second liquid crystal alignment films; and
driving power source means for applying a control pulse to said transparent electrodes on said glass substrates such that the product of a pulse width and an applied voltage exceeds the threshold value of the self-retaining property of said ferroelectric liquid crystal during a writing operation.

8. A spatial light modulator according to claim 7, wherein said first an second liquid crystal alignment films have an electric conductance of $10^{-6}$ S/cm$^2$ or above in a direction of a perpendicular of a plane of the films.

9. A spatial light modulator according to claim 7, wherein said ferroelectric liquid crystal is a chiral smectic liquid crystal having a spontaneous polarization of less than 20 nC/cm$^2$.

10. A spatial light modulator according to claim 7, further including reflection film means sandwiched between said photoconductive film and said liquid crystal alignment films.

11. A spatial light modulator according to claim 10, wherein said reflection film means is a dielectric mirror.

12. A spatial light modulator according to claim 11, wherein said reflection film means is a laminated body comprising a dielectric mirror and metal light blocking films.

13. A spatial light modulating apparatus comprising:
a spatial light modulator having
a semiconductor substrate;
a photodiode deposited on said semiconductor substrate;
a dielectric mirror deposited on said semiconductor substrate,
a first liquid crystal alignment film deposited on said dielectric mirror,
a second liquid crystal alignment film deposited on a glass substrate having a transparent electrode,
a ferroelectric liquid crystal filled between said first and second liquid crystal alignment films; and
a driving power source for applying a control pulse between said glass substrate and said transparent electrode on said glass substrate such that the product of a pulse width and an applied voltage exceeds the threshold value of self-retaining property of said ferroelectric liquid crystal during a writing operation.

14. A spatial light modulating apparatus comprising:
a spatial light modulator including,
a photoconductive film deposited on one glass substrate having a transparent electrode,
a dielectric mirror deposited on said photoconductive film,
a first liquid crystal alignment film deposited on said dielectric mirror,
a second liquid crystal alignment film deposited on another glass substrate having another transparent electrode, and
a ferroelectric liquid crystal filled between said first and second liquid crystal alignment films
an erase pulse light source for supplying an erase pulse for erasing data on said spatial light modulator;
a read pulse light source for supplying a read pulse for reading data on said spatial light modulator; and
a driving power source for applying a drive electric pulse to said spatial light modulator and supplying a sync signal to said erase pulse light source and said read pulse light source to ensure an intermediate gradation display.

* * * * *

UNITED STATES PATENT AND TRADEMARK OFFICE
CERTIFICATE OF CORRECTION

PATENT NO. : 5,130,830
DATED : July 14, 1992
INVENTOR(S) : FUKUSHIMA et al

It is certified that error appears in the above-identified patent and that said Letters Patent is hereby corrected as shown below:

On the title page, item (75):

Change the name of the third inventor from

"Takashi KOZAWAGUCHI" to --Haruki KOZAWAGUCHI--.

Signed and Sealed this

Thirtieth Day of November, 1993

Attest:

BRUCE LEHMAN

Attesting Officer                Commissioner of Patents and Trademarks